United States Patent
Jogand-Coulomb et al.

(10) Patent No.: US 9,104,686 B2
(45) Date of Patent: Aug. 11, 2015

(54) SYSTEM AND METHOD FOR HOST MANAGEMENT OF DISCARDABLE OBJECTS

(75) Inventors: Fabrice Jogand-Coulomb, Allauch (FR); Shalin Patel, Mountain View, CA (US); Brendan Kavanagh, San Jose, CA (US); Judah Gamliel Hahn, Ofra (IL)

(73) Assignee: SanDisk Technologies Inc., Plano, TX (US)

(*) Notice: Subject to any disclaimer, the term of this patent is extended or adjusted under 35 U.S.C. 154(b) by 210 days.

(21) Appl. No.: 13/341,785

(22) Filed: Dec. 30, 2011

(65) Prior Publication Data
US 2012/0173594 A1 Jul. 5, 2012

Related U.S. Application Data

(63) Continuation-in-part of application No. 12/720,006, filed on Mar. 9, 2010, and a continuation-in-part of application No. 12/645,194, filed on Dec. 22, 2009, now Pat. No. 8,849,856, which is a continuation of (Continued)

(51) Int. Cl.
*G06F 17/30* (2006.01)
(52) U.S. Cl.
CPC ................... *G06F 17/30147* (2013.01)
(58) Field of Classification Search
CPC ............ G06F 17/30067; G06F 3/0605; G06F 3/0683; G06F 3/0601; G06F 17/30607
USPC ........................................................ 707/812
See application file for complete search history.

(56) References Cited

U.S. PATENT DOCUMENTS

| 5,491,810 A |   | 2/1996 | Allen |
|---|---|---|---|
| 5,724,578 A | * | 3/1998 | Morinaga et al. ............ 1/1 |

(Continued)

FOREIGN PATENT DOCUMENTS

| CN | 101375579 | 9/2009 |
|---|---|---|
| EP | 0866590 | 8/1998 |

(Continued)

OTHER PUBLICATIONS

"Android Data Caching", Process Fork, http://processfork.blogspot.com/2010/04/android-data-caching.html, Apr. 21, 2010, 2 pages.

(Continued)

*Primary Examiner* — Sheree Brown
(74) *Attorney, Agent, or Firm* — Brinks Gilson & Lione

(57) ABSTRACT

A method and system of managing data in a storage device is provided. The method includes receiving a request to store content in a storage device. If the content is discardable content, the content is divided into a plurality of discardable data objects, each associated with at least one type of discarding priority data. The discardable data objects in the storage device are managed based on the discarding priority data associated with each discardable data object. Management of discardable objects may include selection and deletion of discardable objects based on discarding priority data, as well as further subdivision of existing discardable objects, to maintain a desired amount of free space on the storage device. The system may include a host having a processor and a storage device interface configured to execute the method, or a storage device having a processor configured to execute the disclosed methods.

32 Claims, 12 Drawing Sheets

Related U.S. Application Data application No. PCT/US2009/065056, filed on Nov. 19, 2009, which is a continuation-in-part of application No. 12/336,089, filed on Dec. 16, 2008, now abandoned.

(60) Provisional application No. 61/433,255, filed on Jan. 16, 2011, provisional application No. 61/159,034, filed on Mar. 10, 2009, provisional application No. 61/259,418, filed on Nov. 9, 2009.

(56) References Cited

U.S. PATENT DOCUMENTS

| | | | |
|---|---|---|---|
| 5,754,939 A | 5/1998 | Herz et al. | |
| 5,790,886 A | 8/1998 | Allen | |
| 5,835,935 A * | 11/1998 | Estakhri et al. | 711/103 |
| 5,838,614 A | 11/1998 | Estakhri et al. | |
| 5,893,920 A | 4/1999 | Shaheen et al. | |
| 6,134,584 A | 10/2000 | Chang et al. | |
| 6,138,158 A | 10/2000 | Boyle et al. | |
| 6,185,625 B1 | 2/2001 | Tso et al. | |
| 6,217,752 B1 | 4/2001 | Coots | |
| 6,366,912 B1 | 4/2002 | Wallent et al. | |
| 6,393,465 B2 * | 5/2002 | Leeds | 709/207 |
| 6,453,383 B1 | 9/2002 | Stoddard et al. | |
| 6,542,964 B1 | 4/2003 | Scharber | |
| 6,542,967 B1 | 4/2003 | Major | |
| 6,553,393 B1 | 4/2003 | Eilbott et al. | |
| 6,598,121 B2 | 7/2003 | Challenger et al. | |
| 6,742,033 B1 | 5/2004 | Smith et al. | |
| 6,799,251 B1 | 9/2004 | Jacobs et al. | |
| 6,826,599 B1 | 11/2004 | Shaffer et al. | |
| 6,917,960 B1 | 7/2005 | Decasper et al. | |
| 6,937,813 B1 | 8/2005 | Wilson | |
| 6,996,676 B2 | 2/2006 | Megiddo et al. | |
| 7,043,506 B1 | 5/2006 | Horvitz | |
| 7,043,524 B2 | 5/2006 | Shah et al. | |
| 7,103,598 B1 | 9/2006 | Clement | |
| 7,136,885 B2 | 11/2006 | Wright et al. | |
| 7,155,519 B2 | 12/2006 | Lo et al. | |
| 7,167,840 B1 | 1/2007 | Seidman et al. | |
| 7,246,139 B2 | 7/2007 | Andoh | |
| 7,246,268 B2 | 7/2007 | Craig et al. | |
| 7,248,861 B2 | 7/2007 | Lazaridis et al. | |
| 7,269,851 B2 | 9/2007 | Ackroyd | |
| 7,289,563 B2 | 10/2007 | Yamamoto et al. | |
| 7,305,473 B2 | 12/2007 | Vogt | |
| 7,317,907 B2 | 1/2008 | Linkert et al. | |
| 7,356,591 B2 | 4/2008 | Mousseau et al. | |
| 7,395,048 B2 | 7/2008 | Kotzin | |
| 7,428,540 B1 | 9/2008 | Coates et al. | |
| 7,430,633 B2 | 9/2008 | Church et al. | |
| 7,472,247 B2 | 12/2008 | Vitanov et al. | |
| 7,483,871 B2 | 1/2009 | Herz | |
| 7,512,666 B2 | 3/2009 | Zhou | |
| 7,512,847 B2 | 3/2009 | Bychkov et al. | |
| 7,523,013 B2 | 4/2009 | Gorobets et al. | |
| 7,525,570 B2 | 4/2009 | Kiely et al. | |
| 7,549,164 B2 | 6/2009 | Cook et al. | |
| 7,568,075 B2 | 7/2009 | Fujibayashi et al. | |
| 7,574,580 B2 | 8/2009 | Mahashin et al. | |
| 7,610,341 B2 * | 10/2009 | Daniell | 709/206 |
| 7,650,630 B2 | 1/2010 | Yamada et al. | |
| 7,689,805 B2 | 3/2010 | Moore et al. | |
| 7,748,031 B2 * | 6/2010 | Gonzalez et al. | 726/9 |
| 7,783,956 B2 | 8/2010 | Ko et al. | |
| 7,975,305 B2 | 7/2011 | Rubin et al. | |
| 8,001,217 B1 | 8/2011 | Pan et al. | |
| 8,037,527 B2 | 10/2011 | Milener et al. | |
| 8,463,802 B2 * | 6/2013 | Lin et al. | 707/756 |
| 2001/0000083 A1 | 3/2001 | Crow et al. | |
| 2002/0165825 A1 | 11/2002 | Matsushima et al. | |
| 2002/0194382 A1 | 12/2002 | Kausik et al. | |
| 2003/0009538 A1 | 1/2003 | Shah et al. | |
| 2003/0023745 A1 | 1/2003 | Noe | |
| 2003/0033308 A1 | 2/2003 | Patel et al. | |
| 2003/0114138 A1 | 6/2003 | Ramaswamy et al. | |
| 2003/0115420 A1 | 6/2003 | Tsirigotis et al. | |
| 2003/0166399 A1 | 9/2003 | Tokkonen et al. | |
| 2003/0172236 A1 | 9/2003 | Iyengar et al. | |
| 2003/0187960 A1 | 10/2003 | Koba et al. | |
| 2003/0189589 A1 | 10/2003 | LeBlanc et al. | |
| 2003/0236961 A1 | 12/2003 | Qiu et al. | |
| 2004/0049579 A1 | 3/2004 | Ims et al. | |
| 2004/0117586 A1 | 6/2004 | Estakhri et al. | |
| 2004/0122873 A1 | 6/2004 | Wright | |
| 2004/0127235 A1 | 7/2004 | Kotzin | |
| 2004/0221018 A1 | 11/2004 | Ji | |
| 2004/0221118 A1 | 11/2004 | Slater et al. | |
| 2004/0221130 A1 | 11/2004 | Lai et al. | |
| 2004/0260880 A1 | 12/2004 | Shannon et al. | |
| 2005/0039177 A1 | 2/2005 | Burke | |
| 2005/0076063 A1 | 4/2005 | Andoh | |
| 2005/0097278 A1 | 5/2005 | Hsu et al. | |
| 2005/0102291 A1 | 5/2005 | Czuchry et al. | |
| 2005/0132286 A1 | 6/2005 | Rohrabaugh et al. | |
| 2005/0165644 A1 | 7/2005 | Beyda et al. | |
| 2005/0246543 A1 | 11/2005 | Ezaki et al. | |
| 2005/0273514 A1 | 12/2005 | Milkey et al. | |
| 2006/0008256 A1 | 1/2006 | Khedouri et al. | |
| 2006/0010154 A1 | 1/2006 | Prahlad et al. | |
| 2006/0020745 A1 * | 1/2006 | Conley et al. | 711/103 |
| 2006/0021032 A1 | 1/2006 | Challener et al. | |
| 2006/0059326 A1 | 3/2006 | Aasheim et al. | |
| 2006/0064555 A1 | 3/2006 | Prahlad et al. | |
| 2006/0075068 A1 | 4/2006 | Kasriel et al. | |
| 2006/0075424 A1 | 4/2006 | Talstra et al. | |
| 2006/0080664 A1 | 4/2006 | Jawahar et al. | |
| 2006/0107062 A1 | 5/2006 | Fauthoux | |
| 2006/0129496 A1 | 6/2006 | Chow et al. | |
| 2006/0136446 A1 | 6/2006 | Hughes et al. | |
| 2006/0161604 A1 | 7/2006 | Lobo | |
| 2006/0161960 A1 | 7/2006 | Benoit | |
| 2006/0168123 A1 | 7/2006 | Krstulich | |
| 2006/0168129 A1 | 7/2006 | Van Geest et al. | |
| 2006/0168403 A1 | 7/2006 | Kolovson | |
| 2006/0200503 A1 | 9/2006 | Dosa et al. | |
| 2006/0218304 A1 | 9/2006 | Mukherjee et al. | |
| 2006/0218347 A1 | 9/2006 | Oshima | |
| 2006/0256012 A1 | 11/2006 | Fok et al. | |
| 2006/0259715 A1 | 11/2006 | Getzin et al. | |
| 2006/0282886 A1 | 12/2006 | Gaug | |
| 2006/0294223 A1 | 12/2006 | Glasgow et al. | |
| 2007/0005928 A1 | 1/2007 | Trika et al. | |
| 2007/0033335 A1 | 2/2007 | Maeda et al. | |
| 2007/0088659 A1 | 4/2007 | Phillips | |
| 2007/0100893 A1 | 5/2007 | Sanders | |
| 2007/0112862 A1 | 5/2007 | Iwatsu et al. | |
| 2007/0156845 A1 | 7/2007 | Devanneaux et al. | |
| 2007/0156998 A1 | 7/2007 | Gorobets | |
| 2007/0157217 A1 | 7/2007 | Jacobs et al. | |
| 2007/0165933 A1 | 7/2007 | Thomas et al. | |
| 2007/0179854 A1 | 8/2007 | Ziv et al. | |
| 2007/0185899 A1 | 8/2007 | Ziv et al. | |
| 2007/0186032 A1 * | 8/2007 | Sinclair et al. | 711/103 |
| 2007/0198716 A1 | 8/2007 | Knowles et al. | |
| 2007/0220220 A1 | 9/2007 | Ziv et al. | |
| 2007/0233947 A1 | 10/2007 | Coulson et al. | |
| 2007/0276949 A1 | 11/2007 | Mergi et al. | |
| 2008/0005459 A1 | 1/2008 | Norman | |
| 2008/0005657 A1 | 1/2008 | Sneh | |
| 2008/0010372 A1 | 1/2008 | Khedouri et al. | |
| 2008/0016174 A1 * | 1/2008 | Schiavone et al. | 709/207 |
| 2008/0046449 A1 | 2/2008 | Lee et al. | |
| 2008/0068998 A1 | 3/2008 | Jaggi et al. | |
| 2008/0077550 A1 | 3/2008 | Shike | |
| 2008/0082736 A1 | 4/2008 | Chow et al. | |
| 2008/0091878 A1 | 4/2008 | Stern et al. | |
| 2008/0098093 A1 | 4/2008 | Simon et al. | |
| 2008/0098169 A1 | 4/2008 | Kaluskar et al. | |
| 2008/0127355 A1 | 5/2008 | Lorch et al. | |
| 2008/0147808 A1 * | 6/2008 | Pang | 709/206 |
| 2008/0177935 A1 | 7/2008 | Lasser et al. | |
| 2008/0189796 A1 | 8/2008 | Linn et al. | |

(56) References Cited

U.S. PATENT DOCUMENTS

| | | | |
|---|---|---|---|
| 2008/0201754 A1 | 8/2008 | Arling et al. | |
| 2008/0208961 A1 | 8/2008 | Kim et al. | |
| 2008/0222348 A1 | 9/2008 | Mosek | |
| 2008/0235520 A1 | 9/2008 | Becker et al. | |
| 2008/0243773 A1 | 10/2008 | Patel et al. | |
| 2008/0244074 A1 | 10/2008 | Baccas et al. | |
| 2008/0244201 A1 | 10/2008 | Heintel et al. | |
| 2008/0263113 A1 | 10/2008 | Krishnaiyer et al. | |
| 2008/0281883 A1 | 11/2008 | Cannon et al. | |
| 2009/0055351 A1 | 2/2009 | Whitehorn et al. | |
| 2009/0089366 A1 | 4/2009 | Toth | |
| 2009/0132621 A1 | 5/2009 | Jensen et al. | |
| 2009/0181655 A1* | 7/2009 | Wallace et al. | 455/414.3 |
| 2009/0204682 A1 | 8/2009 | Jeyaseelan et al. | |
| 2009/0210631 A1 | 8/2009 | Bosworth et al. | |
| 2009/0222117 A1* | 9/2009 | Kaplan et al. | 700/94 |
| 2009/0234865 A1* | 9/2009 | Gillum et al. | 707/100 |
| 2009/0327712 A1 | 12/2009 | Sarig | |
| 2010/0017557 A1* | 1/2010 | Nakanishi et al. | 711/103 |
| 2010/0030963 A1 | 2/2010 | Marcu et al. | |
| 2010/0049758 A1 | 2/2010 | Kumar | |
| 2010/0115048 A1 | 5/2010 | Scahill | |
| 2010/0121712 A1 | 5/2010 | Shahshahani et al. | |
| 2010/0146187 A1 | 6/2010 | Grimsrud et al. | |
| 2010/0153474 A1* | 6/2010 | Raines et al. | 707/812 |
| 2010/0235329 A1 | 9/2010 | Koren et al. | |
| 2010/0235473 A1 | 9/2010 | Koren et al. | |
| 2011/0010497 A1 | 1/2011 | Bryant-Rich et al. | |
| 2011/0099326 A1 | 4/2011 | Jung et al. | |
| 2011/0179143 A1 | 7/2011 | Yairi | |

FOREIGN PATENT DOCUMENTS

| | | |
|---|---|---|
| EP | 0 492 106 | 4/2000 |
| EP | 1211861 | 6/2002 |
| EP | 1 308 853 | 5/2003 |
| EP | 1 445 703 | 8/2004 |
| EP | 1489510 | 12/2004 |
| EP | 1 923 780 A1 | 5/2008 |
| EP | 2 249 254 | 11/2010 |
| FR | 2793576 | 5/1999 |
| GB | 2349546 | 11/2000 |
| GB | 2350973 | 12/2000 |
| JP | 2005 169861 | 6/2005 |
| KR | 1020090012308 | 2/2009 |
| WO | WO 00/41510 | 7/2000 |
| WO | WO 02/060154 | 8/2002 |
| WO | WO 02/100117 | 12/2002 |
| WO | WO 03/021441 | 3/2003 |
| WO | WO 03/094474 | 11/2003 |
| WO | WO 2004/068369 | 8/2004 |
| WO | WO 2005/022942 | 3/2005 |
| WO | WO 2005/109302 | 11/2005 |
| WO | WO 2007/044899 | 4/2007 |
| WO | WO 2007/117251 | 10/2007 |
| WO | WO 2007/138584 | 12/2007 |
| WO | WO 2007/146763 | 12/2007 |
| WO | WO 2009/088709 A2 | 7/2009 |
| WO | WO 2009/105280 | 8/2009 |
| WO | WO 2010/074848 | 7/2010 |
| WO | WO 2010/104814 | 9/2010 |

OTHER PUBLICATIONS

"Cisco MDS 9000 Series Caching Services Module with IBM TotalStorage™ SAN Volume Controller Storage Software for Cisco MDS 9000", Cisco Systems, Inc., http://www.cisco.com/warp/public/cc/pd/ps4159/ps4358/prodlit/md9ds_ds.pdf, printed on Dec. 7, 2010, 9 pages.

"Persistant Caching", IBM® Cognos® 8 Virtual Manager Installation and Configuration Guide, http://publib.boulder.ibm.com/infocenter/c8bi/v8r4m0/index.jsp?topic=/com.ibm.swg.im.cognos.vvm_installation_guide.8.4.0.doc/vvm_installation_guide_id1555PersistentCaching.html, Nov. 27, 2009, 1 page.

Cache Management for the IBM Virtual Taper Server, http://www-03.ibm.com/support/techdocs/atsmastr.nsf/WebIndex/FLASH10054, printed on Jan. 3, 2011, 5 pages.

Ex Parte Quayle Action for U.S. Appl. No. 12/644,885, dated Dec. 7, 2011, 5 pages.

International Report on Patentability issued in International Application No. PCT/IL2009/000752, mailed Feb. 17, 2011, 2 pages.

International Search Report and Written Opinion for PCT Patent Application Serial No. PCT/US2010/026596, dated Jul. 29, 2010, 15 pages.

International Search Report and Written Opinion for PCT Patent Application Serial No. PCT/US2009/065456, dated Apr. 9, 2010, 11 pages.

International Search Report and Written Opinion for PCT/US2011/047270, dated Dec. 20, 2011, 13 pages.

International Search Report for PCT/IB2011/001206, mailed Aug. 30, 2011, 5 pages.

Notice of Allowance for U.S. Appl. No. 12/644,885, dated Feb. 16, 2012, 9 pages.

Office Action for U.S. Appl. No. 12/020,553, dated Dec. 19, 2011, 20 pages.

Office Action for U.S. Appl. No. 12/020,553, dated May 12, 2011, 19 pages.

Office Action for U.S. Appl. No. 12/185,583, dated Jun. 6, 2011, 13 pages.

Office Action for U.S. Appl. No. 12/185,583, dated Jan. 31, 2012, 17 pages.

Office Action for U.S. Appl. No. 12/336,089, dated Apr. 13, 2011, 14 pages.

Office Action for U.S. Appl. No. 12/336,089, dated Oct. 31, 2011, 14 pages.

Office Action for U.S. Appl. No. 12/336,089, dated Mar. 22, 2012, 9 pages.

Office Action for U.S. Appl. No. 12/645,149, dated Jan. 26, 2012, 9 pages.

Office Action for U.S. Appl. No. 12/645,194, dated Dec. 8, 2011, 26 pages.

Office Action for U.S. Appl. No. 12/720,282, dated Dec. 1, 2011, 14 pages.

Office Action for U.S. Appl. No. 12/720,006, dated Nov. 14, 2011, 11 pages.

Office Action for U.S. Appl. No. 12/796,267, dated Feb. 10, 2012, 22 pages.

Office Action for U.S. Appl. No. 12/720,006, dated May 1, 2012, 11 pages.

Office Action for U.S. Appl. No. 13/172,589, dated Mar. 22, 2012, 9 pages.

Restriction Requirement for U.S. Appl. No. 12/494,758, dated Nov. 21, 2011, 6 pages.

The International Search Report and Written Opinion for PCT Patent Application Serial No. PCT/US2009/065056, dated Jul. 29, 2010, 35 pages.

Written Opinion for PCT/IB2011/001206, mailed Aug. 30, 2011, 6 pages.

Written Opinion of the International Searching Authority issued in International Application No. PCT/IL2009/000752, mailed Feb. 17, 2011, 4 pages.

Deng et al., "Architectures and Optimization Methods of Flash Memory Based Storage Systems", *Journal of Systems Architecture*, vol. 57, pp. 214-227, 2011.

Douglis et al., "Position: Short Object Lifetimes Require a Delete-Optimized Storage System", *Proceedings of the 11th Workshop on ACM SIGOPS European Workshop*, ACM, 2004, pp. 1-6.

International Search Report and Written Opinion dated May 7, 2008 for PCT Application Serial No. PCT/IL2008/000126, 12 pages.

International Search Report and Written Opinion dated Oct. 26, 2009 for PCT Application Serial No. PCT/IL2009/000752, 11 pages.

Jiang, Zhimei et al., "Web Prefetching in a Mobile Environment", IEEE Personal Communications, IEEE Communications Society, US, vol. 5, No. 5, Oct. 1998, pp. 25-34.

Notification Concerning Transmittal of International Preliminary Report on Patentability for International Application No. PCT/US2009/065456, dated Jun. 30, 2011, 9 pages.

(56) References Cited

OTHER PUBLICATIONS

Notification Concerning Transmittal of International Preliminary Report on Patentability for International Application No. PCT/US2009/065056, dated Jun. 30, 2011, 27 pages.
Notification Concerning Transmittal of International Preliminary Report on Patentability for International Application No. PCT/US2010/026596, dated Sep. 22, 2011, 10 pages.
Notification of Transmittal of the International Search Report and the Written Opinion of the International Searching Authority, or the Declaration for International Application No. PCT/US2011/047270, dated Dec. 20, 2011, 13 pages.
O'Hare, Gregory et al., "Addressing Mobile HCI Needs Through Agents", Proceedings of the 4$^{th}$ International Symposium on Human Computer Interaction with Mobile Devices and Services (MobileHCI'02), Pisa, Italy, 2002, pp. 311-314. Spinger Verlag LNCS 2411.
Rigoutsos et al., "Chung-Kwei: A Pattern-Discovery-Based System for the Automatic Identification of Unsolicited E-Mail Messages (SPAM)", *Proceedings of the First Conference on Email and Anti-Spam (CEAS), Bioinformatics and Pattern Discovery Group*, IBM, 2004.
U.S. Appl. No. 13/341,783, filed Dec. 30, 2011, entitled, "System and Method for Managing Discardable Objects", 54 pages.
U.S. Appl. No. 61/159,034, filed Mar. 10, 2009, entitled, "Smart Caching", Inventors: Judah Gamliel Hahn and David Koren (24 pages).
Xiang et al., "Cost-Based Replacement Policy for Multimedia Proxy Across Wireless Internet", IEEE Global Telecommunications Conference, GLOBECOM '01, San Antonio, TX, Nov. 25-29, 2001, pp. 2009-2013.
Yin et al., "A Generalized Target-Driven Cache Replacement Policy for Mobile Environments", Proceedings of the 2003 Symposium on Applications and the Internet (SAINT '03), pp. 1-20.
Cheng et al., "StreamTo: Streaming Content Using a Tamper-Resistant Token", retrieved from: http://doc.utwente.nl/56985/1/000001 1c.pdf, Dec. 12, 2005, pp. 1-18.
Han et al., "EMCEM: An Efficient Multimedia Content Encryption Scheme for Mobile Handheld Devices", *Information Science and Security*, Jan. 1, 2008, pp. 108-114.
Office Action for U.S. Appl. No. 12/336,089 dated Jan. 4, 2013, 17 pages.
Notice of Allowance for U.S. Appl. No. 12/645,149 dated Oct. 11, 2012, 9 pages.
Office Action for U.S. Appl. No. 12/645,194 dated Dec. 20, 2012, 24 pages.
Office Action for U.S. Appl. No. 12/645,194 dated Jun. 4, 2013, 25 pages.
Office Action for U.S. Appl. No. 12/720,006 dated Jan. 9, 2013, 11 pages.
Office Action for U.S. Appl. No. 12/720,006 dated May 20, 2013, 11 pages.
Office Action for U.S. Appl. No. 12/895,397, dated Dec. 5, 2012, 11 pages.
Notice of Allowance for U.S. Appl. No. 12/895,397 dated May 23, 2013, 9 pages.
Notice of Allowance for U.S. Appl. No. 12/895,428 dated Feb. 14, 2013, 8 pages.
Office Action for U.S. Appl. No. 13/172,589 dated Jan. 4, 2013, 17 pages.
Office Action for U.S. Appl. No. 13/327,383 dated Jan. 18, 2013, 13 pages.
Office Action for U.S. Appl. No. 13/327,383 dated Jun. 14, 2013, 13 pages.
Office Action for Chinese Patent Application Serial No. 2010800035852 dated Feb. 5, 2013, 5 pages.
International Report on Patentability for PCT/US2011/047047 dated Feb. 28, 2013, 8 pages.
International Preliminary Report on Patentability for PCT/US2011/047270 dated Feb. 28, 2013, 10 pages.
International Search Report and Written Opinion for PCT/US2012/020767 dated Nov. 13, 2012, 20 pages.
International Search Report and Written Opinion for PCT/US2012/024400 dated Aug. 8, 2012, 14 pages.
Office Action for U.S. Appl. No. 12/336,089, dated Jul. 25, 2012, 17 pages.
Office Action for U.S. Appl. No. 12/645,149, dated May 8, 2012, 9 pages.
Office Action for U.S. Appl. No. 12/645,194, dated Aug. 22, 2012, 30 pages.
Office Action for U.S. Appl. No. 12/720,282, dated May 1, 2012, 12 pages.
Office Action for U.S. Appl. No. 12/720,333, dated May 11, 2012, 7 pages.
Office Action for U.S. Appl. No. 12/796,267, dated Jul. 30, 2012, 23 pages.
Office Action for U.S. Appl. No. 12/895,428, dated May 25, 2012, 15 pages.
Office Action for U.S. Appl. No. 13/172,589, dated Jul. 26, 2012, 15 pages.
International Search Report and Written Opinion for PCT/US2011/047047, dated May 8, 2012, 12 pages.
International Search Report for PCT/US2012/020502, dated Jul. 10, 2012, 3 pages.
Written Opinion for PCT/US2012/020502, dated Jul. 10, 2012, 6 pages.
Partial International Search Report and Invitation to Pay Additional Fees for PCT/US2012/020767, dated Aug. 27, 2012, 9 pages.
Rekkedal, Simen, Caching of Interactive Branching Video in MPEG-4, University of Oslo, Thesis for the Candidatus Scientarium Degree, Jul. 12, 2004 (137 pages).
U.S. Appl. No. 13/341,783, filed Dec. 30, 2011, entitled "System and Method for Managing Discardable Objects" (54 pages).
Reddy, Mike et al., "Adaptive Mechanism for Web Browser Cache Management", 1998, 6 pages.

\* cited by examiner

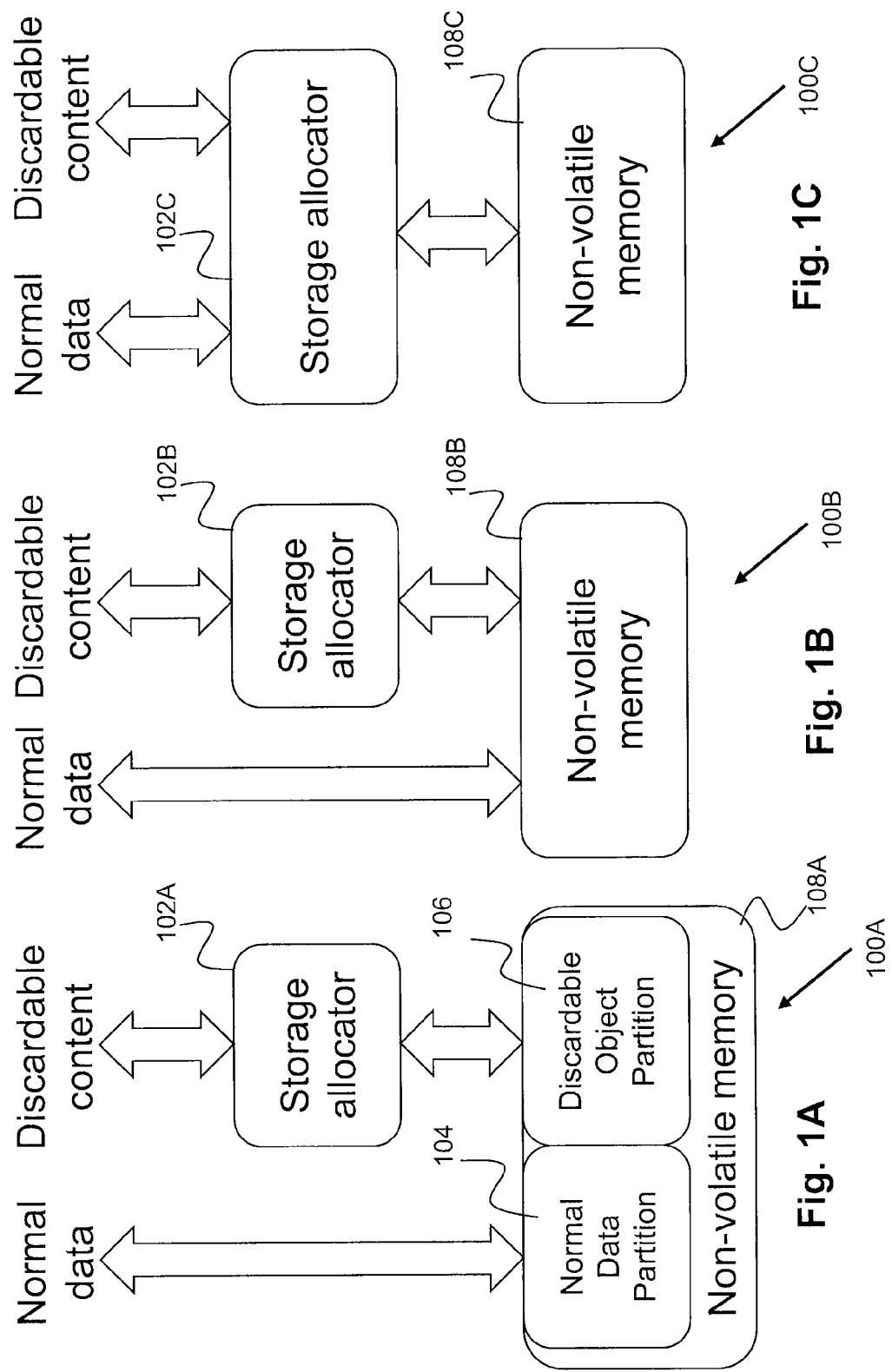

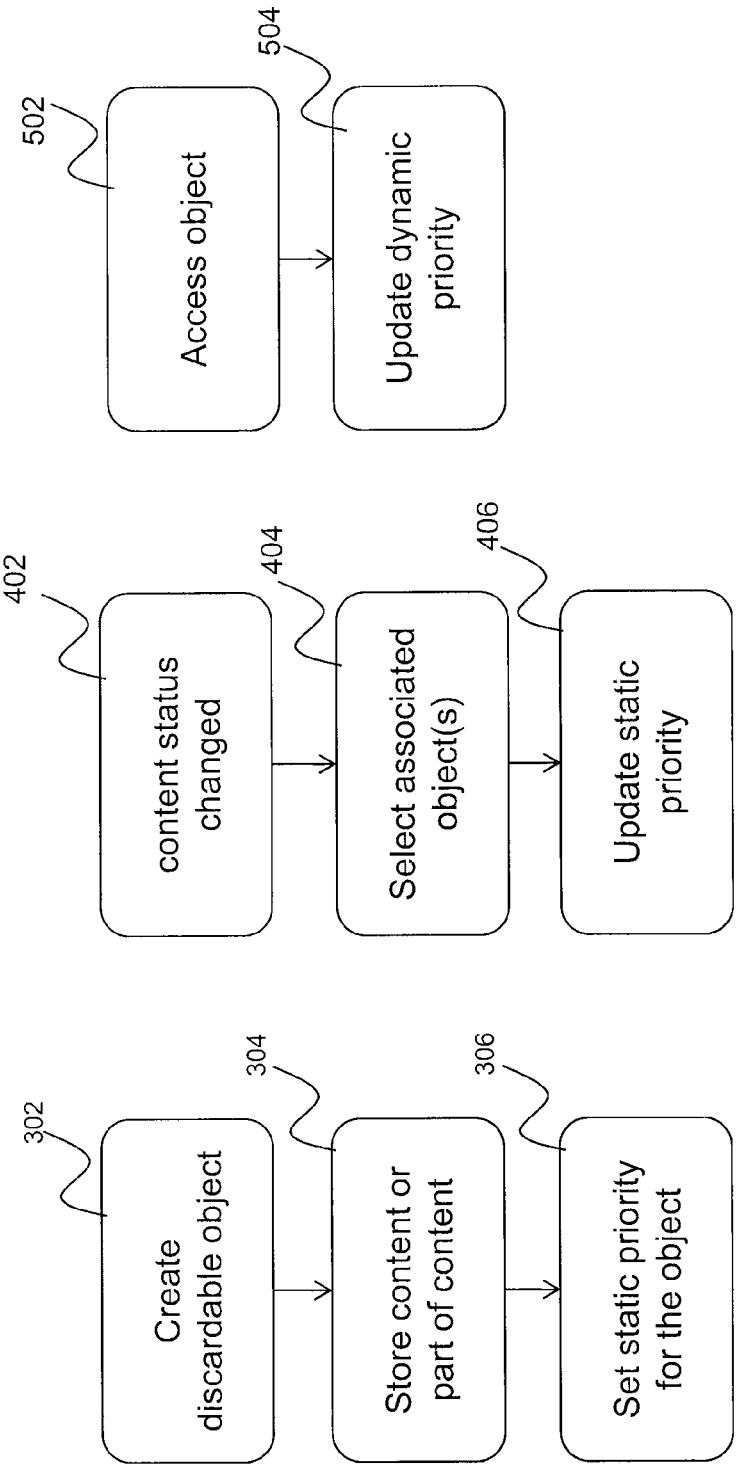

| 602 | 604 | 606 | 610 | 612 | 600 |
|---|---|---|---|---|---|
| F8FF FFFF (cluster #0) | 0000 0000 (cluster #1) | 0000 000<u>3</u> (cluster #2) | 0000 000<u>4</u> (cluster #3) | <u>0</u>FFF FFFF (cluster #4) | 1000 0006 (cluster #5) |
| 1000 0007 (cluster #6) | 1000 0008 (cluster #7) | 1000 0009 (cluster #8) | 1000 000A (cluster #9) | 1000 000B (cluster #10) | 1000 000C (cluster #11) |
| <u>1</u>FFF FFFF (cluster #12) | F000 0010 (cluster #13) | 0000 0000 (cluster #14) | FFFF FFFF (cluster #15) | 0000 0000 (cluster #16) | 0000 0000 (cluster #17) |
| 0000 0000 (cluster #18) | 0000 0000 (cluster #19) | 0000 0000 (cluster #20) | 0000 0000 (cluster #21) | 0000 0000 (cluster #22) | 0000 0000 (cluster #23) |

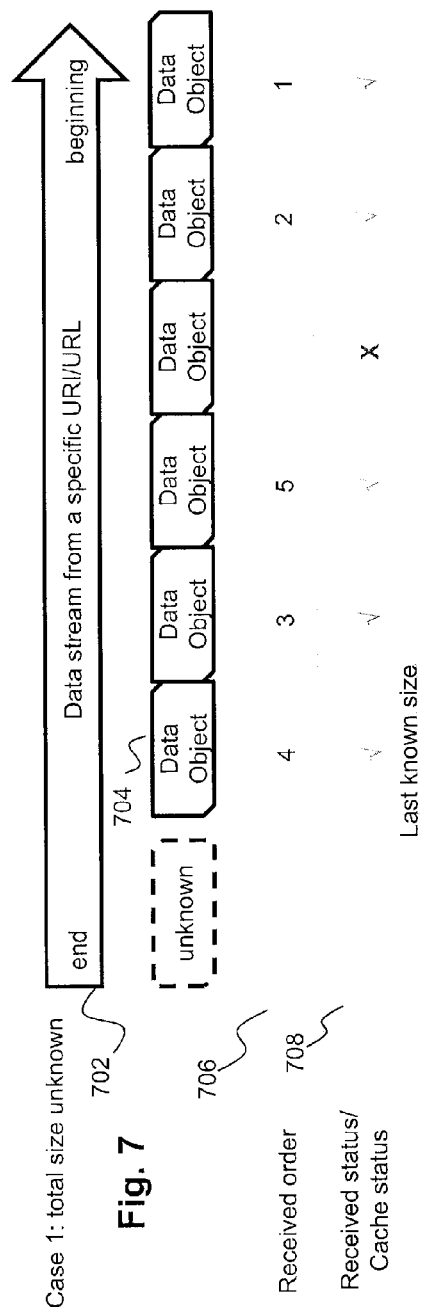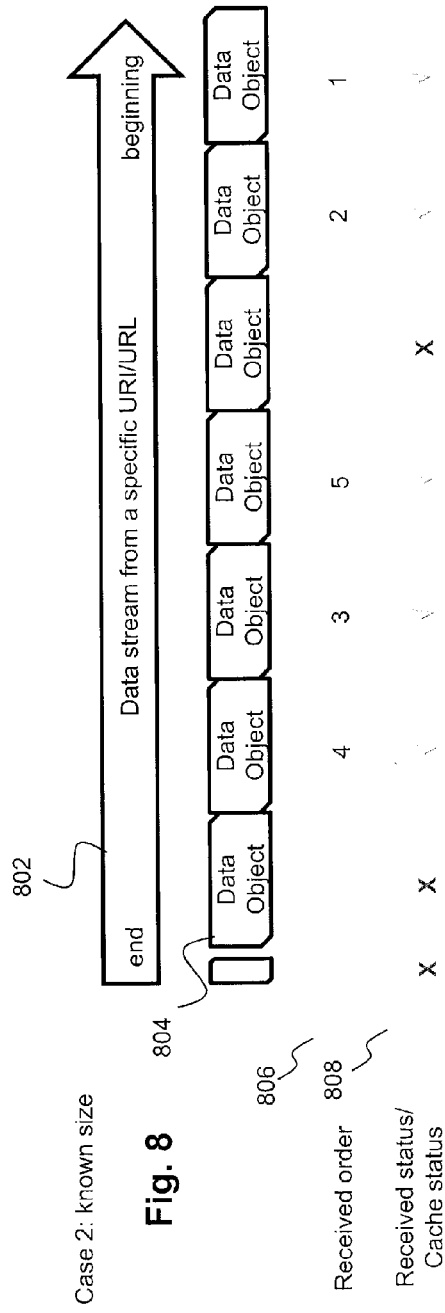

SYSTEM AND METHOD FOR HOST MANAGEMENT OF DISCARDABLE OBJECTS

CROSS-REFERENCE TO RELATED APPLICATIONS

This application claims the benefit of U.S. Provisional App. No. 61/433,255, filed Jan. 16, 2011, and is a continuation-in-part of U.S. application Ser. No. 12/720,006, filed Mar. 9, 2010, pending, which claims the benefit of both U.S. Provisional App. No. 61/159,034, filed Mar. 10, 2009, and U.S. Provisional App. No. 61/259,418, filed Nov. 9, 2009, and which is a continuation-in-part of U.S. application Ser. No. 12/645,194, filed Dec. 22, 2009 now U.S. Pat. No. 8,849,856, which is a continuation of PCT App. No. PCT/US2009/65056, filed Nov. 19, 2009, which is a continuation-in-part of U.S. application Ser. No. 12/336,089, filed Dec. 16, 2008 now abandoned, wherein the entirety of each of the above-noted applications are hereby incorporated herein by reference.

FIELD OF THE INVENTION

The present invention generally relates to a method and to a system for managing files in a storage device.

BACKGROUND

Non-volatile memory is typically involved in many purposes. Amongst these purposes: storing data, software, applications, operating systems, music, video, games, and more. Non-volatile memory may be embedded in a device or removable. Some storage devices with non-volatile memory are typically used to distribute content such as music, movies, videos and games. Nowadays it is typical that such distribution includes unsolicited content in addition to content intentionally acquired by the user. This type of distribution is not limited to optical storage such as CD, DVD and BD, but may also be included on memory cards such as microSD or USB sticks. These types of flash memory form factors allow for distribution of content for use in devices without an optical drive, such as mobile devices.

Rewritable non-volatile memory provides the advantage that the space used by unsolicited content could be reclaimed once such unsolicited content gets erased. Non-volatile memory can also be used to store additional content after the acquisition of the memory by the user. For example user-generated content could be added. Downloaded content is another example. The non-volatile memory could be used to cache network data in order to improve performance and to optimize the use of the network.

Content services are flourishing and a user can utilize these services to acquire additional content. Similar to the distribution of unsolicited content in non-volatile memory devices, many of these services are also making use of the non-volatile memory to stage unsolicited content. In some cases this unsolicited content is targeted for the user. Such unsolicited content is typically intended to increase the spending of the user and/or to provide a better user experience. Locally stored content is no longer subject to connection delay, bandwidth limitation and network cost thus resulting in an instant-on user experience with unconstrained content quality.

However, unsolicited content uses storage space that could be needed by the user and may need to be discarded. Furthermore, even certain user-generated content may be unnecessarily taking up space in the memory and could benefit the user by being discarded. Therefore there is a need for a method and system that intelligently manages storage for the user.

SUMMARY

In order to address the problem of the accumulation of discardable content, it would be advantageous to store such content for as long as the storage space required to accommodate the discardable content is not required for other data, and to selectively remove the discardable content from the non-volatile memory in order to guarantee a minimum amount of free storage space. Various embodiments designed to implement such file management are provided herein.

In order to address the above-identified need, a method for host management of a non-volatile memory is disclosed. The method includes, in a host to which a non-volatile memory is operatively coupled, receiving a request to store at least a portion of content in the non-volatile memory. The at least a portion of the content is divided into a plurality of discardable data objects that are each associated with respective discarding priority data. The method further includes managing the discardable data objects in the non-volatile memory based on the discarding priority data of each of the respective discardable data objects. Management of the discardable objects may include updating discarding priority data over time for the various discardable objects, further subdividing existing discardable objects into smaller discardable objects, and/or discarding discardable objects to make room for other discardable or non-discardable content based on discarding priority data for the discardable objects.

According to another aspect, a method for host management of a non-volatile memory is disclosed. The method includes, in a host device to which a non-volatile memory is operatively coupled, receiving a request to store a new data and determining if sufficient space is available in the non-volatile memory. When sufficient space is not available, the method also includes selecting discardable objects to discard from the non-volatile memory. A largest of the selected discardable objects may be divided into smaller discardable objects and certain discardable objects from the selected discardable objects are discarded/deleted based on discarding priority data associated with the selected discardable objects. Host systems for implementing the above-noted methods are also contemplated.

In another aspect, a host system for managing a non-volatile memory is disclosed. The host system may include a host processor and a non-volatile memory interface configured for communication with the non-volatile memory. The host processor is configured to receive a request to store at least a portion of content in the non-volatile memory. The host processor is further configured to determine if sufficient space is available in the non-volatile memory and select a set of discardable objects from a plurality of discardable objects in the non-volatile memory, where the host processor selects the set of discardable objects based on at least one type of dynamic discarding priority data. The host processor is then further configured to delete one or more of the discardable objects in the set based on at least one type of static discarding priority data.

In another aspect, a method for managing a memory system operatively coupled with a host is disclosed. The memory system includes a non-volatile memory and a processor in communication with non-volatile memory, where the processor receives a request to store at least a portion of content in the non-volatile memory. The processor of the memory system divides the at least a portion of the content into discardable data objects and associates each discardable data object with discarding priority data. The memory system processor then manages the discardable data objects in the non-volatile memory based on the discarding priority data of each of the respective discardable data objects. Management of the discardable objects may include the memory system updating discarding priority data over time for the various discardable objects, further subdividing existing discardable objects into smaller discardable objects, and/or discarding discardable objects to make room for other discardable or non-discardable content based on discarding priority data for the discardable objects.

In yet another aspect, a method for managing discardable objects in a memory system includes, in processor of a memory system operatively coupled to a host, receiving a request to store new data in the non-volatile memory of the memory system, determining if sufficient space is available in the non-volatile memory and when sufficient space is not available, selecting discardable objects to discard from the non-volatile memory. The memory system processor may then divide one of the selected discardable objects into smaller discardable objects and then discard discardable objects from the selected discardable objects based on discarding priority data associated with the selected discardable objects. Memory systems, including Solid State Disk (SSD) and flash memory card format memory systems, for implementing the above-noted methods are also contemplated.

BRIEF DESCRIPTION OF THE DRAWINGS

FIGS. 1A-1C illustrate functional block diagrams of alternate embodiments of handling discardable and non-discardable data.

FIGS. 3-5 are flow charts illustrating different methods for handling discardable data objects in the storage system of FIG. 2.

FIG. 6 is an example FAT32 table used to track discarding priority data according to an example embodiment.

FIG. 7 is a block diagram illustrating receipt of content where the size of the content is unknown.

FIG. 8 is a block diagram illustrating receipt of content where the size of the content is known.

DETAILED DESCRIPTION

Figure 2A:
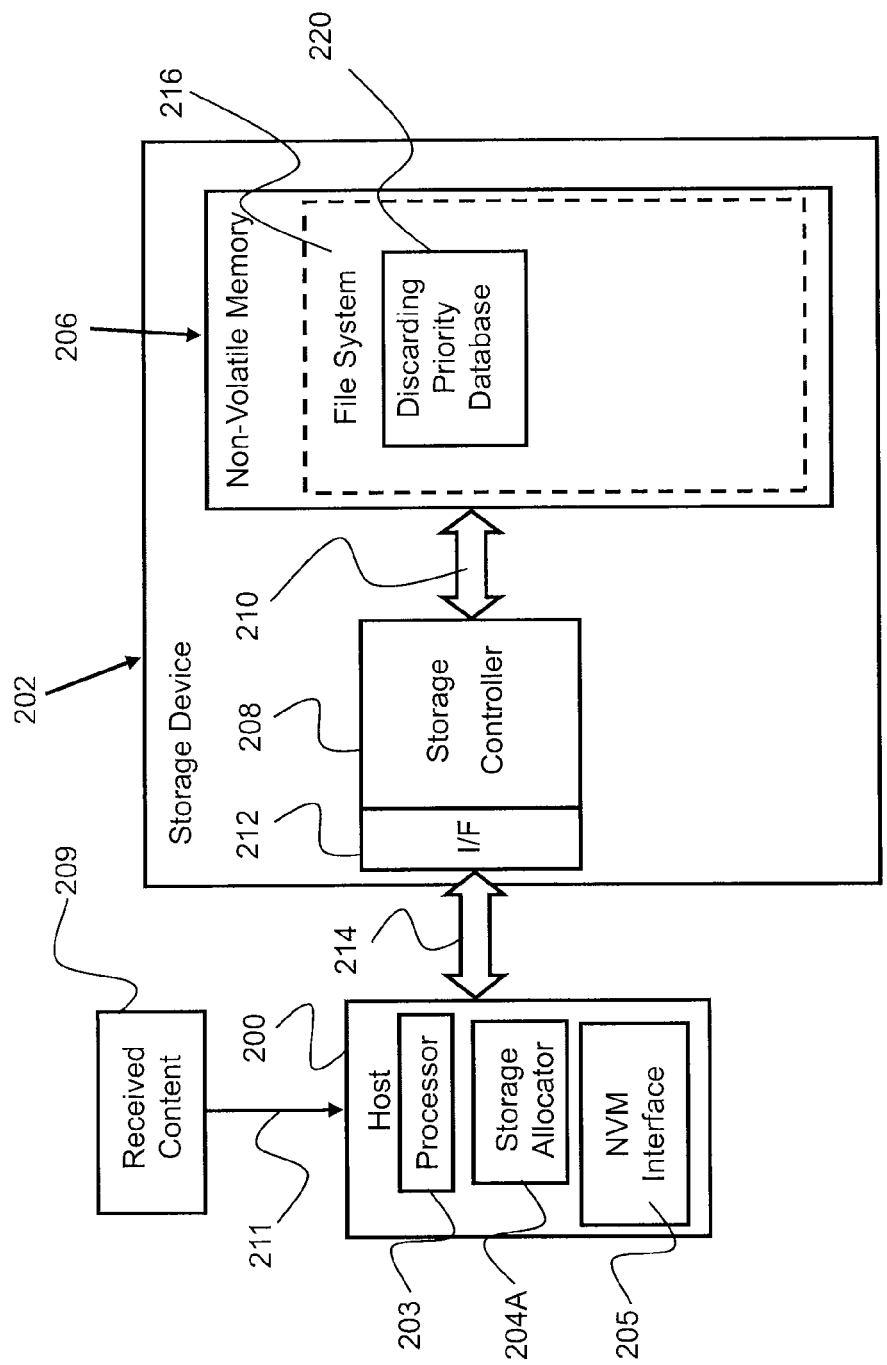
FIG. 2A is a block diagram of a storage system having a storage allocator located on a host according to an example embodiment.

Discardable content may be of various types. In some cases it is in the form of unsolicited content. In other cases, it may be content that has been requested or generated by the user, but which has a copy or a backup and thus can be discarded when more storage space is needed. As discardable content may be of various types and origin, and may have different purposes, it is important to properly handle priorities in order to determine which data to discard first. The description that follows provides various details of exemplary embodiments. However, this description is not intended to limit the scope of the claims but instead to explain various principles of the invention and the manner of practicing it.

Setting Content as Discardable

There are different circumstances where content may be marked as discardable. By way of example, without limitation, the content source or the application on the host first receiving the content could mark the content with information indicating that it is discardable. In one example, before content may be handled as discardable, it should already be specified as such. Unsolicited content may already be marked as such when received and stored accordingly into discardable object. For example, the application that receives the content could be aware that this content should be marked discardable. A movie service application could check for promotional content and receive this content as discardable.

In another example, solicited content such as user generated data or content requested or owned by the user may be specified as discardable when a copy or backup has been created. The solicited content would be received by the system that handles discardable objects and treated as such. For example, the application that makes the copy or backup would then indicate the content is discardable or initiate the process or perform the steps to make it as such. In some embodiments, where discardable objects are implemented as files, the solicited content file once specified as discardable is then handled as discardable object(s). In other embodiments, the content is moved into discardable objects.

There are also some cases where the unsolicited content stored in discardable object(s) maybe converted to be non-discardable data and treated the same way as requested or user-generated content. For example, when the user purchases a promotional movie title that originally may have been pre-loaded or downloaded through no request of a user. In some implementations, such content could be copied into the user space and be changed back to discardable. In some other embodiments, purchasing or requesting unsolicited content will keep it stored as discardable when a copy exists online. However, the discarding priority data for that content could be updated because the user has specified this is of interest.

As described in greater detail below, the use of a file format is a one implementation of discardable objects. Discardable objects may be handled as individual files and the file system would permit to handle a directory of objects and to manage such objects. As such, creating a file from discardable content means creating a new discardable object and deleting a file mean deleting a discardable object. The file system would also permit discardable objects to be stored fragmented in the memory which allows for optimization of memory usage. Once set as discardable, the content is stored into one or more discardable objects.

Storing Data into a Discardable Object

Content that an application or a user wants to control and explicitly delete would not be stored in discardable objects and would instead be treated as normal content. Discardable objects store content that may be deleted automatically by an underlying system when needed to accommodate the storage of other later received content where the later received content may be additional discardable content for storage in discardable objects or normal data (e.g. non-discardable or solicited content). The underlying system that controls the management and creation of discardable objects is composed of a storage allocator that receives the data to store in discardable objects and that discards discardable objects as needed. FIGS. 1A-1C illustrate different scenarios of how the storage allocator may share the non-volatile memory with normal data.

In FIG. 1A, a system 100A where discardable content is handled by a storage allocator 102A is shown. A first dedicated space, such as partition 104, has been reserved in the non-volatile memory 108A to store the discardable objects, while a second dedicated space, such as partition 106 is dedicated to normal (e.g. non-discardable) data. The configuration of FIG. 1A, while illustrating one option for configuring the non-volatile memory 108A, may not permit certain host file systems to dynamically reclaim a reserved space (e.g. partition 104).

In the alternative system 100B shown in FIG. 1B, the storage allocator 102B monitors the available storage space in non-volatile memory 108. In some embodiments, a single file system is shared and the storage allocator 102B stores the discardable content as discardable objects and discards objects as needed to free additional space. The storage allocator 102B could also use a dedicated file system which may be embedded in the file system used for normal data. In such an embedded file system arrangement, the discardable objects may be hidden from normal files and the storage allocator monitors the non-volatile memory 108B to determine which discardable object has been overwritten by normal data. In the arrangement of FIG. 1B discardable objects are randomly discarded when normal data is written to the non-volatile storage 108. In the alternative embodiment of FIG. 1C, the storage allocator 102C handles all storage on the non-volatile memory 108C and thus manages normal data and discardable objects. In this configuration, the discardable objects created by the storage allocator from discardable content may remain hidden from normal file operations while discardable objects may be selectively discarded as needed. The storage allocator 102C may be implemented on a host, for example as part of, or underneath, the host file system. The storage allocator 102C may alternatively be implemented in a storage device.

Figure 2B:
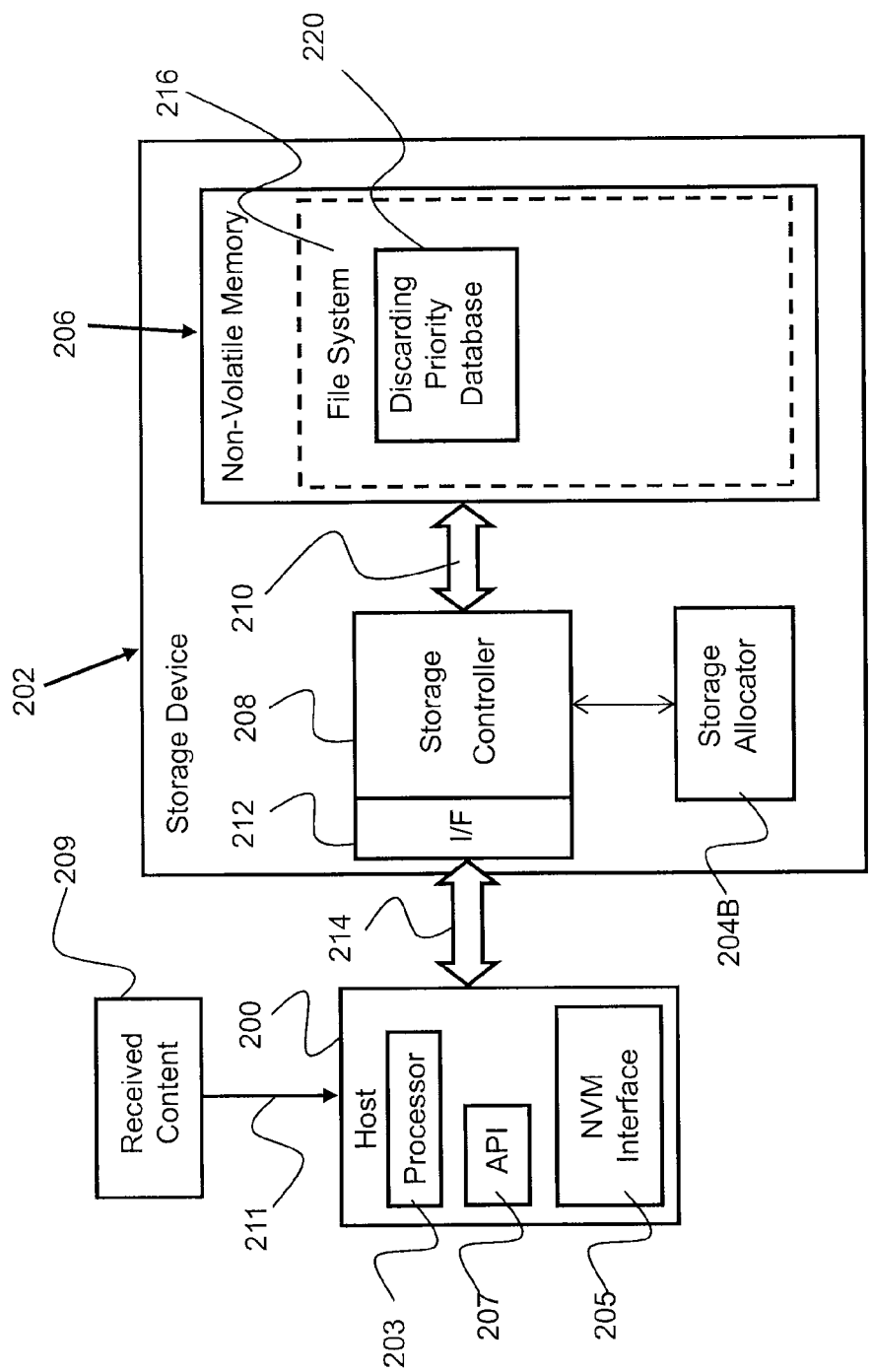
FIG. 2B is an alternative embodiment of the storage system of FIG. 2A having a storage allocator located on a storage device according to an example embodiment.

FIGS. 2A and 2B show systems with a host device 200 and a storage device 202, where the storage allocator 204 may be located solely on the host 200 (FIG. 2A), or solely on the storage device 202 (FIG. 2B). When the storage allocator 204A is solely on the host 200, it may be implemented as part of the file system as described earlier. In instances when the storage allocator 204B is located in the storage device 202, the storage allocator 204B monitors incoming data and to make sure that normal data and discardable content are not in conflict with each other (e.g. making sure one is not unintentionally overwritten by the other) and furthermore takes care of discarding discardable objects when space is needed. In this configuration, where the storage allocator 204B is located in the storage device 202, the storage device 202 provides an additional application programming interface (API) 207 available for use by the host 200 to provide discardable content, access (read, list and etc.) and manually delete discardable objects. For example, the host 200 may use the API 207 to list and manually delete discardable objects associated with content that has been subject to a takedown by a source of that content. The underlying system (storage allocator 204B in the storage device) may manage automated deletion of the discardable objects.

In other implementations, the storage allocator could be implemented partly on the host and partly on the storage device 202. For example, the host 200 may be configured to handle selection of discardable objects for deletion and the storage device 202 may be configured to manage the storage of discardable objects and the file system in a manner that keeps the discardable objects hidden to the file system 216. In an alternative embodiment, as discussed in greater detail below, the portion of the storage allocator on the storage device 202 may show all discardable objects as regular content, as if no discardable content were ever deleted from the storage device, and keep source information for tracking the location of all discardable objects so that any missing discardable objects that had been deleted by the storage allocator could be later fetched. This manner of maintaining a list of all discardable objects ever stored on the storage device, and the tracking information on where the discardable objects can be found from their original sources, may be extended to the point where no discardable content is actually stored on the storage device, but could be fetched using the saved file path or other tracking information maintained by the storage allocator on the storage device.

Host device 200 may be dedicated hardware or a general purpose computing platform having a processor 203 and a non-volatile memory interface 205. The host device 200 may receive content 209 from a content source, such as a remotely located content server, over a communication channel 211. In the embodiment of FIG. 2A, where the storage allocator 204A resides on the host 200, the processor 203 may execute the storage allocator functions and communicate with the storage device 202 via the non-volatile memory interface 205. In the embodiment of FIG. 2B, where the storage allocator 204B resides on the storage device 202, an API 207 on the host 200 allows the host access to discardable objects managed by the storage allocator 204B on the storage device 202. The storage allocator 204B in this implementation may be executed by a processor of the storage controller 208.

Storage device 202 includes a storage area 206 for storing various types of data (e.g., music files, video files, etc.). Storage device 202 also includes a storage controller 208 that manages storage area 206 via data and control lines 210. Storage controller 208 also communicates with the host device 200 via host interface 212 over a communication channel 214 that may be wired or wireless. Storage area 206 may be non-volatile memory, for example NAND flash. In different embodiments, the storage area 206 may be made up of one type of non-volatile memory or different types of non-volatile memory, for instance single level cell (SLC) and multi-level cell (MLS) flash memory, in various amounts and combinations. Storage controller 208 controls all of the data transfers to/from storage area 206 and data transfers to/from host device 200 by controlling, for example, "read", "write" and "erase" operations, wear leveling, and so on, and by controlling communication with host 200. Storage area 206 may contain, for example, user data (user-generated) and discardable data objects, protected data that is allowed to be used only by authorized host devices, and security data that is used only internally by storage controller 220. In order to facilitate easy access to data files that are stored in storage device 200, storage device 200 is provided with a file system 216. Storage allocator 204 may be hardware, firmware, software executable by the processor of the storage controller 208 or any combination thereof. Information regarding discarding priority data assigned by the storage allocator 204 to discardable objects in the storage area 206 may be maintained in a discarding priority database 220 or other data structure. The discarding priority database 220 may be stored in the storage area 206 or elsewhere in the storage device 202.

The storage allocator 204 manages storage area 206 and the storage of normal (user-generated or solicited) data and discardable data. Managing storage area 206, or managing storage of data in storage area 206, may include, for example, generating discardable objects from received content 209 that is discardable, sub-dividing discardable objects into smaller discardable objects, and selectively removing one or more discardable data objects of one or more different discardable content to free up storage space, freeing a storage area by removing all files marked as discardable, and remapping clusters of a file to a lower-performance storage module. Managing storage area 206 or files stored therein may include managing other, additional, or alternative aspects of storage area 206 or files stored therein.

Discarding Priorities

Some content may be worth keeping longer than some other. For example, a daily news story can typically be discarded on a daily basis when the latest news is received. As such, it is important to use priorities to determine what is best to discard from the storage area 206 to accommodate a storage request, whether the storage request is for normal (solicited or user-generated) data or additional unsolicited content. The storage allocator 204 may assign discardable data a discarding priority.

Because some content may be worth keeping longer than other content, not all content will have equal discarding priorities and therefore discardable object(s) associated with a first content may not have the same discarding priority as discardable object(s) associated with a second content. Also, some parts of the same content might be of more interest for the user or host application than others, and thus discardable objects used for the same content could have different priorities.

For example, the discarding priority may be set by the storage allocator 204 according to discarding priority data such as content type (e.g. music files could be anticipated to be listen more times than a large movies file would be watched, so the discardable object or objects created for a large movie file may be assigned a discarding priority (overall or relative rank) that is greater than that of a music file such that the discardable object(s) for the large movie file would be more likely to be discarded than those of the music file). The determination of a discarding priority for a discardable object by the storage allocator could take in account any of a number of discarding priority data being tracked by the storage allocator, including the overall size of the content stored in one or more objects. For example, a larger file might be seen less than smaller content duration. By extension, in implementations where the size of the discardable objects is independent of the content, a discardable object that can fit an entire file should be discarded with lower priority. The discardable content could also be less discardable when the source is on the storage device as the copy may not be guaranteed.

The discarding priority could change as conditions change. For example, when content has expired it could become more discardable; for content that has just been activated (e.g. released from embargo) the discarding priority could be changed to reflect that the discardable object is now available; and content that has been purchased could be become less discardable as the user's interest in that particular content have changed. Accordingly, in some embodiments, the priority assigned or modified by the storage allocator 204 could also take into account whether the content has been solicited or has always been discardable.

The selection of discardable objects to discard may be based on the above type of information alone that is still somewhat static, but having a discard priority based on static information may not reflect the user's current interest in the discardable object. The relevance of discardable content could also take in account information that changes relative to the access of one discardable object in the entire set of discardable objects for the particular discardable content. This information allows selecting a discardable object relative to other discardable objects using dynamic information instead of, or in addition to, static information.

The discarding priority data used by the storage allocator to perform the selection of objects to discard could be based on the static information or the dynamic information or both. Static information is useful as it typically provides information about the content as a whole, such as a type of data (e.g. a temporary file) or an age of the discardable content as a whole (e.g. the original storage date on the storage device of the discardable content). Dynamic information refers to information on access to individual discardable objects within a particular discardable content and thus provides information on the user's interest in specific portions of the discardable content. The use of discarding priority data by the storage manager 204 to determine priorities or otherwise select discardable objects for deletion provides more flexibility than a simple first in first out arrangement typical of caching solutions. Furthermore, the discarding priority data permits decisions on discarding to be made at the level of discardable objects that may only contain part of a piece of content.

In one embodiment, the storage allocator 204 may first select a list of candidate object(s) to discard based on dynamic, or both dynamic and static, discarding priority data and then to use one or more types of static discarding priority data to determine which of the discardable objects in the selected candidate objects to discard. Information about the incoming data storage request could also be used to determine the best discardable object to discard. For example, the storage space needed to accommodate the request could be used as a criteria and a discardable object of the closest superior or equal size could be discarded in order to reduce the number of objects discarded to accommodate the incoming data storage request.

For example: dynamic information such as the last access date, the number of user accesses to all or a part of the discardable object(s) content, and the size of the discardable object could be used by the storage allocator to perform the selection of candidate eligible discardable objects to be discarded. Then the static information may be used to decide which one(s) of the selected discardable objects should be discarded. The selection criteria could also combine multiple parameters and also combine dynamic and static for the pre-selection or to determine which object to discard. One goal of the storage allocator 204 is to set discarding priorities that result in a maximum number of the most relevant discardable objects (those that the user or applications would likely most want to have access to) stored on the non-volatile memory.

It is also important to note that the discarding priority could be set explicitly. For example, if relevance of discardable objects is based on the last access date, discardable objects for content that has been activated (e.g. released from embargo or purchased) may have its discarding priority set by the storage allocator 204 as if just accessed in order to prevent the content to be deleted.

In some embodiments, the storage allocator 204 may store the discarding priority data in a database 220 in the storage area 206 or some other area on the storage device 202. The database 220 could be updated each time a discardable object is accessed and when the status of the content as a whole (from which the discardable object was created) changes. The database 220 may provide a versatile solution for handling the different types of discarding priority data and the many criteria used as discarding priority data could be tracked and updated.

FIGS. 3-5 show examples of processes of setting and updating the discard priority of discardable objects. FIG. 3 shows an example of setting static discarding priority when a discardable object is created (or updated in some embodiments). When discardable content is identified, for example data is received that includes a flag or other information indicating that the content is discardable, the storage allocator 204 creates one or a plurality of discardable objects from the discardable content and stores the discardable object or objects in the storage area 206 (at 302, 304). At step 306, static discarding priority data, such as discardable content size, birth date (age), solicited status, may be recorded and a discarding priority calculated based on content type, content duration (e.g. the time duration it would take to consume the content, such as the time to watch the movie contained in the content), expiration date, embargo status (i.e., the content is not released before a certain date and remains invisible/unusable before that), etc. is set. Priority may also take into account the recorded information and recording such information may not be needed. The step numbers are used to identify different steps and do not imply a specific order. For example, in some embodiments step 306 could take place before step 304.

FIG. 4 shows an example of updating static discardable priority data following a change in the discardable content status. When a status of content changes, the storage allocator 204 identifies the discardable object(s) associated with the affected content (at 402, 404). The static priority for the relevant ones of the identified objects is then updated to reflect the status change (at 406). The status change could be a change that follows the fact that the user has watched it once partly or in full. Alternatively, the change in discardable status may be based on embargoed release date or expiration date. In yet other alternatives, the change could follow the fact the content has been acquired in full or that the content has been copied or backed up. When the change applies to all discardable objects used for the content (i.e., relates to static discarding priority data), the associated discardable objects would be selected first (at step 404) then the priority for each of them is updated (at step 406) by the storage allocator.

FIG. 5 shows an example of updating the dynamic priorities of a discardable object when the object is being accessed. For example when the discardable object is read because associated content is enjoyed by the user (at 502), the priority could be updated to make the object less discardable (at 504), for example by increasing a number of plays or accesses recorded in the discarding priorities database 220 for the object or portion of the object accessed.

In some other embodiments, rather than the storage allocator 204 storing discarding priority data on the discardable objects and/or discarding priorities for the discardable objects in a discarding priority database 220 as noted above, the file system allocation table (FAT) itself could be used to store such information. For example, if the discardable objects are stored as files, storing discarding information may done in an unused portion of a file allocation table (FAT) entry associated with the file, by setting one or more unused bits. Because different file systems have different structures, marking files as non-discardable, or discardable data objects as discardable and assigning discarding levels, is adapted to the file system structure used. In a file system such as FAT32, the four uppermost bits in an entry are not used and some or all of these bits could be used on one side to recognize (mark) discardable content and on the other to set a priority state (e.g. based on content type). A file system file directory typically contains information about the size, creation date and last access date for all of its files. As discussed in greater detail below with respect to selection and deletion of discardable objects to make room for incoming data, this could be useful dynamic discarding priority data with which to perform a pre-selection of discardable objects (files), followed by use of the static discarding priority data stored in the uppermost bits of the file system to determine which file(s) of the pre-selected files to delete.

In some embodiments, some information useful for assessing priority is already available in the file system in the form of information such as last access, age, and etc., while the other discarding priority data is stored in a database or table. In one embodiment, information regarding static discarding priority data may be maintained separately from information regarding dynamic discarding priority data so that updates may be independent and making it easier to update dynamic information and to perform a pre-selection of discardable objects, as discussed below, based on static and/or dynamic discarding priority data.

In one implementation, the file system could suffice to handle discarding priorities: information such as last access, size, and file extension already maintained in a typical file system may be used as some of the discarding priority criteria. Other discarding information could be encoded in the unused upper most bit of file system entries. FIG. 6 shows an example of using FAT32 upper most unused bits for storing discarding information.

Objectification Strategy (Creating Objects to Hold Content Data)

Having data stored locally, such as on a storage device 202, offers multiple advantages to a host device 200, such as a smart phone, tablet or other mobile host, including access without network latency and longer battery life because wireless communication may be reduced or eliminated at the time of user access to the already stored data. Local storage of data not only provides a better user experience, but also can reduce the amount of data that needs to be transferred over a cellular network, because the data may have been stored locally while the host was in communication with a Wi-Fi network or the data was transferred outside of peak network usage times, which is valuable to the network operator and to users with limited data plans. The benefits may be maximized when the data most relevant to the user is present locally. Therefore benefits are obtained (1) when the discardable object of least interest to a user is discarded first and (2) when the discardable objects retained in the storage device 202 store data from a maximum number of relevant content pieces. In order to maximize the number of different content that is represented, for example maximizing the number of different files (content pieces) represented, each of the different content may be stored in one or more discardable objects. Storing each of the different content pieces into multiple objects allows discarding the least relevant part or parts of a particular content piece while maximizing the number of different content pieces being represented, even if only partially. One should note that a user might not be interested in the content in its entirety. For example, the user can skip to a specific part of the movie (or skip a part of the movie); a game resource file might carry multiple levels that are not played anymore, etc. As the pattern of user access to a given piece of content is not necessarily linear, the part of the content being accessed might still be present even if the file or other type of content is not complete. By breaking discardable content into multiple discardable objects, and associating with the discardable object the position of the data in the overall content, the storage allocator 204 allows for identifying the missing parts for later retrieval.

Storing discardable content in multiple objects may avoid or reduce the impact of the following constraints and limitations:
The content has to be received in full. This could be a limitation when the file is downloaded using a progressive download as the download could be interrupted before the file is downloaded in its entirety. Requiring a complete download of the content could also be a limitation when receiving a stream. Keeping a discardable content piece in full, for example an entire file or an entire streamed movie, takes more space than keeping only the relevant portions and thus prevents maximizing the number of relevant content being present even if partially. Managing discardable content in full, for example discarding an entire file or an entire streamed movie in response to receiving additional data, may lead to freeing more space then actually needed for the received data. Therefore splitting the content such as a file or data stream into multiple discardable objects presents multiple advantages. As used herein, content or a content piece refers to a collection of related information, which in the context of a file may be a title (such as a music title) or in the context of streamed data may be a collection of related streamed content. In one embodiment, the storage allocator may be configured to favor maintaining a maximum number of different discardable content (content pieces) by adjusting determined priorities for discardable objects of each of the different discardable content such that a last discardable object for one content piece would be determined by the storage allocator to be less discardable than discardable objects for another content piece having multiple discardable objects in the storage device.

FIGS. 7 and 8 illustrate storing a stream into multiple discardable objects. FIG. 7 illustrates a scenario where discardable streamed content 702 is received and the total size for the complete content is unknown. FIG. 8 illustrates a scenario where the complete size of the received content 802 is known. In both instances, the storage allocator 204 breaks the discardable content 702, 802 into discardable objects 704, 804. The storage allocator 204 may track the order 706, 806 of the discardable objects and keep list 708, 808 of which discardable objects 704, 804 of the streamed content 702, 802 are missing.

The data for the discardable stream of data need not be received in order or even as a continuous chain. If the received discardable data pertains to a streamed/progressive download video, where the user has skipped portions of the video being streamed, then those skipped parts would be missing to begin with and the order of data received would not conform with the order of data in the complete file. The storage allocator 204 stores the order the discardable objects are chained together in discardable content to ensure the order remains known. The storage allocator 204 keeps track of objects that have been discarded or which have not been received. Information on the order of a discardable object chain may be maintained in the discarding priority database or other data structure in non-volatile memory or elsewhere in the storage device. Content split into multiple discardable objects is still presented to the application and user as a single content piece, i.e., the storage allocator exposes content rather than objects.

Saving information about the parent content could be of importance for embodiments where the missing part could be fetched. For example when objects with that part have been discarded or the part was never stored in a discardable object. In that situation, keeping information about the chain of objects representing the content independently from when the part was received could be of importance in order to determine if a part is missing or not.

Also, discarding a discardable object that contains part of the content can be done not only according to the relevance of the object but also according to the entire content. For example, when the content has expired, the discarding priority for all the objects containing data from that content can be changed.

Figure 9:
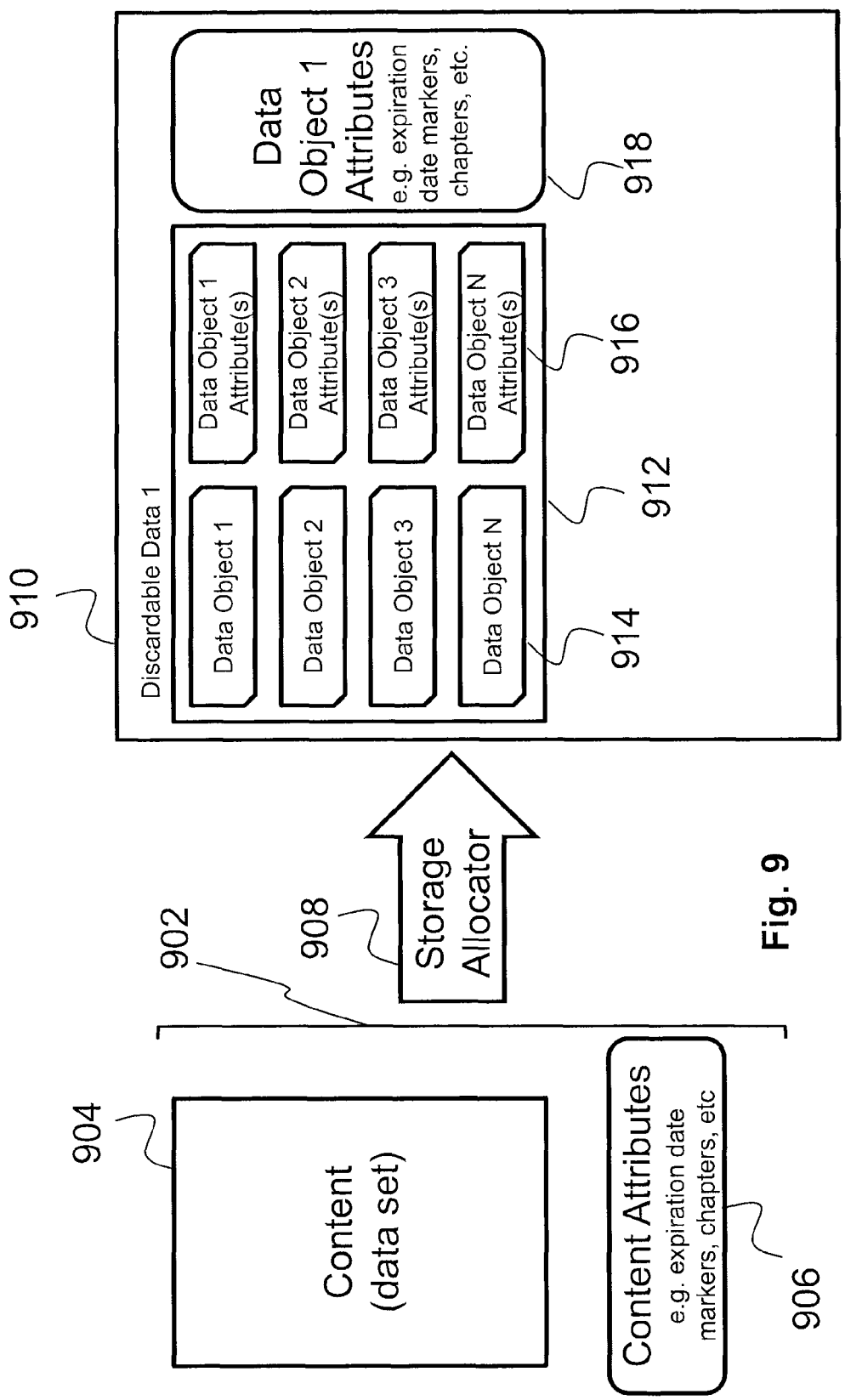
FIG. 9 is a flow diagram of a process of dividing received data into individual discardable data objects in a storage device.

FIG. 9 illustrates content split into multiple discardable objects while the attribute of the content is recorded along the priority of each individual object. Referring to FIG. 9, downloaded content 902, which may include the content data 904 and attributes 906 of the content data 904. For example the attributes 906 provide extra information about the content as a whole such as content type, expiration date, embargoed date, location URI, etc. Storing this content as discardable, the storage allocator 908 uses some of these attributes to evaluate a static discarding priority for the content's discardable object(s) and records extra information such as URI, expiration date and embargoed date. Additional information such as creation date, size, and etc., could also be used as parameter for the discarding priority.

As noted above, one technique for managing discardable objects is for the storage allocator to use a discarding priority database 220. An alternative is for the storage allocator to use a file system. Discardable objects may be formed from a single piece of content and are tracked individually. A typical file system allows for creation of discardable objects of different sizes for deletion of individual discardable objects. Each discardable object may be associated with attributes such as static and dynamic discarding priority data, along with a discarding priority derived from the static and dynamic discarding priority data. Information about the source of the discardable content, such as file path or Universal Resource Identifier (URI) information, and position in the content of discardable data objects formed from the content, as discussed above, may also be kept. The file path (or URI) may be used to uniquely reference each discardable object. Although the discardable content may be in any of a number of formats, for ease of reference in the following example the content is referred to as a file (which may be a complete file or partial file) and the data objects created from the file referred to as file elements. Discarding an object would mean deleting the file element that represents the object. Creating an object would mean creating a new file element.

The content data 904, which may be a complete or partial piece of content (e.g. a complete file or a partial file) 902, is marked as "discardable" in a data structure 910, which may be a discarding priority database or part of the host file system, and divided up into a plurality of discardable data objects 914. Each data object 914 is associated with respective discarding priority data 916 so that the storage device 202 may manage individual discardable data objects 914 of the same discardable content 912 separately. The entire discardable file 912, now a collection of discardable data objects 914, may be optionally associated with discarding attributes 918 that contains additional information such as URI, expiration date, embargoed date, and etc. Each discardable data object 914, as discussed in greater detail below, is a portion of the discardable file and each discardable data object 914 may be of the same size or different sizes. All of a discardable file (or partial discardable file), or just certain discardable data objects of one or more of the discardable files (or partial discardable files) may be removed later to reclaim at least the free storage space required to maintain a desired amount of free space in the storage device or to make space for incoming data.

Because the likelihood of the user using the various discardable files may differ from one discardable file to another, each unsolicited file (i.e., each discardable file) may be assigned in advance a discarding priority level. In addition, each of the discardable data objects 914 of a discardable file 912 may be associated with discarding priority data 916 with which to determine a discarding priority level. The discarding priority level may be assigned based on one or more criteria such as the probability of using the file, the probable revenue associated with using the file, the file's size, the file's type, the file's location, the file's age, etc.

Additional information, such as file name and extension could be used to recognize the parent content (e.g. complete piece of content such as a complete movie, song or file) and the position of the object in the chain of discardable objects that make up the content. This may be accomplished in a similar way as done by applications such as those that create .zip files. The compression of a .zip process could be a benefit, but is not a requirement for discardable objects. Furthermore, the file elements created from the file may not be of identical size as typically done with spanning.

Recording information about the remote content URI (the source content URI and the URI of content backup/copy) as part of a discarding attribute 916 allows the storage allocator 204 to fetch any missing parts. The URI could point to any type of data and could have extra information about the access protocol.

Extra information may be stored along with the URI, such as information to determine if the content has been changed since it was stored. For example, a hash of the content or a date stamp could be used to determine if the content has changed. Accordingly, in one embodiment, actions could be taken to update the local copy. For example, the host application or storage allocator may decide to update the content with the updated content it recognizes from the difference between the hash of what the content looked like at the time of acquisition and what the application sees the next time it accesses or checks over the source content.

Keeping track of the content URI may help the storage allocator 204 to keep track of all the content that has ever been stored, even partially, on the non-volatile memory 206. The information could be presented in a way for the user to easily re-access some of this content. For example, the content could be presented ordered by type, access date, cumulative number of accesses, etc. The user could also be asked to confirm when a connection is needed to acquire missing pieces, etc.

Figure 10:
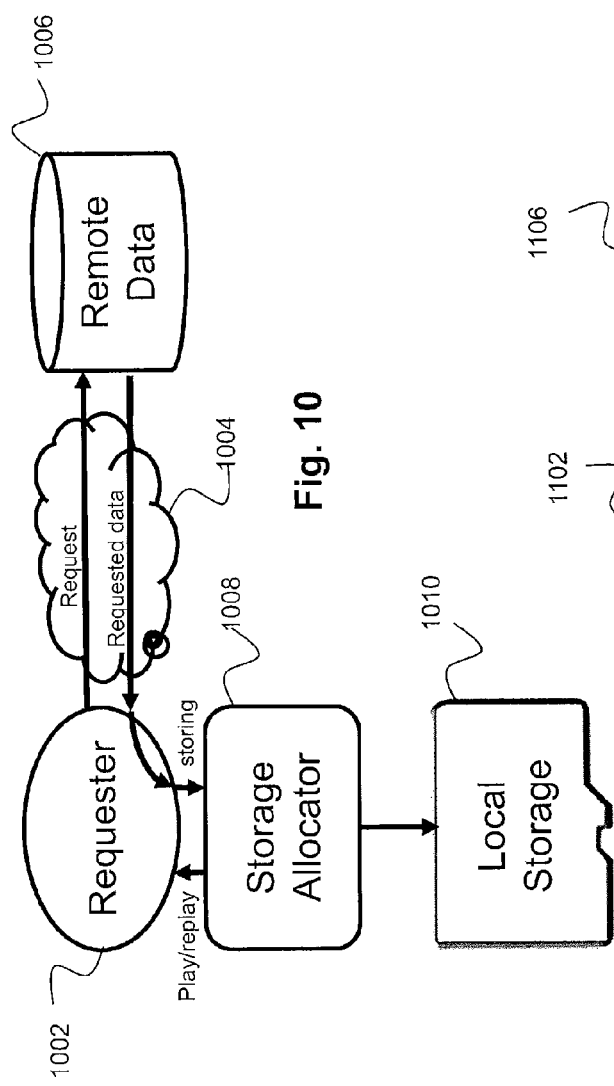
FIG. 10 is a flow diagram illustrating a process of managing data accessed from a remote data source.
Figure 11:
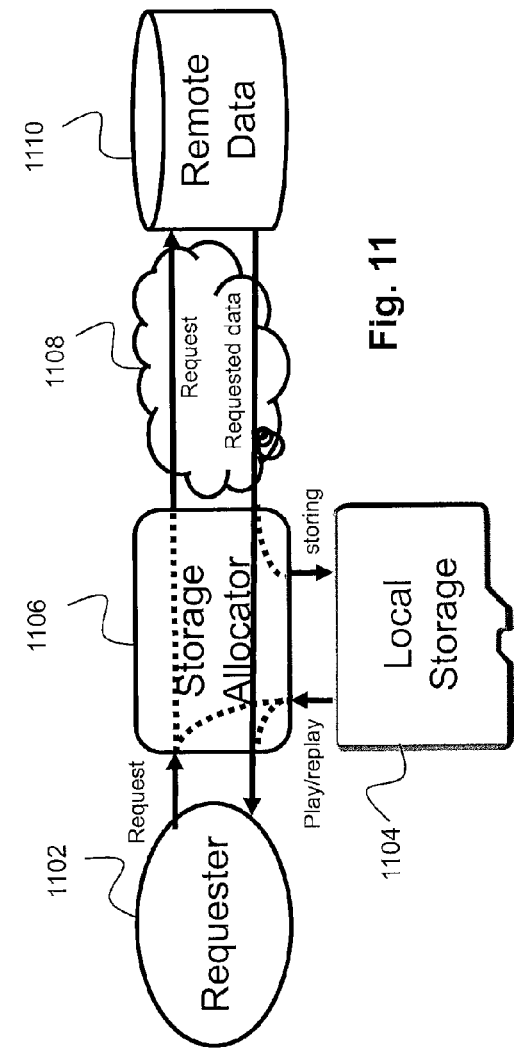
FIG. 11 is a flow diagram illustrating an alternative process of managing data accessed from a remote data source.

FIGS. 10 and 11 illustrate the process of fetching missing discardable objects, for example missing discardable objects from streamed or progressively downloaded content. In an embodiment as shown on FIG. 10, the requester 1002 communicates with the storage allocator 1008 and fetches the data over a network 1004 from a remote data location 1006 which may then be stored in place of the missing discardable object(s). In the example of FIG. 10, the storage allocator 1008 provides the URI or other tracking data for the missing discardable objects and the requester 1002 fetches the object(s). In other embodiments, as shown in FIG. 11, the storage allocator 1106 is implemented such that it is connected to the network 1108 and can fetch the missing data from the appropriate remote data location 1110 on its own using the URI or other tracking information for the missing discardable objects. This is transparent for the requester 1102 and the received data could be stored in place of the missing object(s). In the scenario of FIG. 11, the requester 1102 is unaware of whether streamed data it has requested was already cached in the local storage device 1104 or has been requested by the storage allocator 1106. The requester 1002, 1102 may refer to the host, or more specifically the application software running on the host.

Determining Discardable Object Size

The amount of data that a discardable object holds may have a direct impact on performance and thus on the user experience. For example, allowing large discardable objects may limit the number of content pieces (i.e., different content such as different movies, songs, or other data) that may be represented in the non-volatile memory 206 of the storage device 202 which could have a direct impact on performance and user experience.

There are different ways for the storage allocator 204 to set the size of each discardable object:

a) All discardable objects could be created to have a same size and that size could be determined according to a percentage of the maximum possible capacity available for the discardable objects, where the maximum possible capacity for the discardable objects may be preset for a particular type of storage device 202 b) All discardable objects could be of same size where the size is determined according to a maximum number of discardable objects that the system could handle. For example, this would be typical of using a file system where the maximum number of clusters determines the maximum number of entries.

c) Discardable objects of preset size may, however, result in a mediocre user experience for multimedia content that contains an index directory and/or frames. If the information for of these sections (e.g., index directory or frames) is stored in more than one object, discarding a discardable objects with part of that type of information may result in the rest of the data for that content being unusable and thus requiring that the storage allocator fetch the missing parts. As such, in another embodiment, the storage allocator may split the discardable content into discardable objects that relate to the content specificities: for example matching the content index or storing an entire number of frame(s) in a single object.

d) The discardable content may also have information about the parts which are the most relevant for most users and thus these parts could be stored on one or more discardable objects only containing the most relevant information to permit the less relevant parts to be discarded at first. The discarding priority could also be set to recognize that these discardable objects are less discardable than other discardable objects for the same content. Information about the most interesting parts of particular discardable content may be provided by the server from which the content is received, or from the host, in order to determine how to split the content into multiple objects as well as the size of the size of each of the discardable objects.

e) Application resources could be split into discardable objects that relate to the application itself. For example, a game resource file which holds multiple levels could be split so that each level fits into one or more discardable objects only containing data for that level (i.e., no object having information from two different levels). For example, information about each level could be provided by the game application to the storage allocator and the resource file split accordingly. In some instances, the resource file could use a format that comes with different sections where each would be stored (at start) as an individual object.

f) In a more sophisticated implementation, the size of discardable objects could also vary during the lifetime in the storage device 202. Although the size of discardable objects created by the storage allocator, whether they are the same or different size with respect to each other, may remain the same during their lifetime, there may be instances where it is advantageous to change the size of an already existing discardable object. A discardable object may be split into smaller discardable objects over its lifetime. In order to facilitate this subdividing of existing discardable objects, the underlying system, for example the storage allocator 204 and discarding priorities database 220, tracks information about storage elements whose size is smaller or equal to the size of the discardable object. The splitting of a discardable object into smaller discardable objects may be accomplished by using dynamic information regarding the tracked storage elements within the discardable object. Thus, in selecting a discardable object to discard, the storage allocator could use such dynamic information and in the process the object could be split into smaller objects whose size is determined according to the dynamic information itself. The least relevant parts of the data in a particular discardable object could then be discarded first.

This approach of further splitting a discardable object is of particular interest as it allows optimizing the size of the objects without any particular knowledge of the content type. For example, it does not require parsing the content to identify the index and/or the frames. In an alternative embodiment, the storage allocator 204 could initially store a piece of content into a single discardable object, rather than automatically creating a plurality of discardable objects upon receipt for that content, and then use the tracking of the storage elements within the initial discardable object to determine where to split the discardable object. For example, the object may be selected at first because it meets certain criteria such as a large size then the object gets split based on the tracked information of the storage elements within the discardable object. A new selection could be performed, or least relevant parts could be discarded at first. The split process could repeat itself multiple times and the content ends up being stored on one or more objects of smaller size. For example, when discardable objects are implemented with files, the tracked storage elements that are smaller than that the discardable object may be file system clusters that could be tracked to determine how to split a discardable object file.

Figure 12:
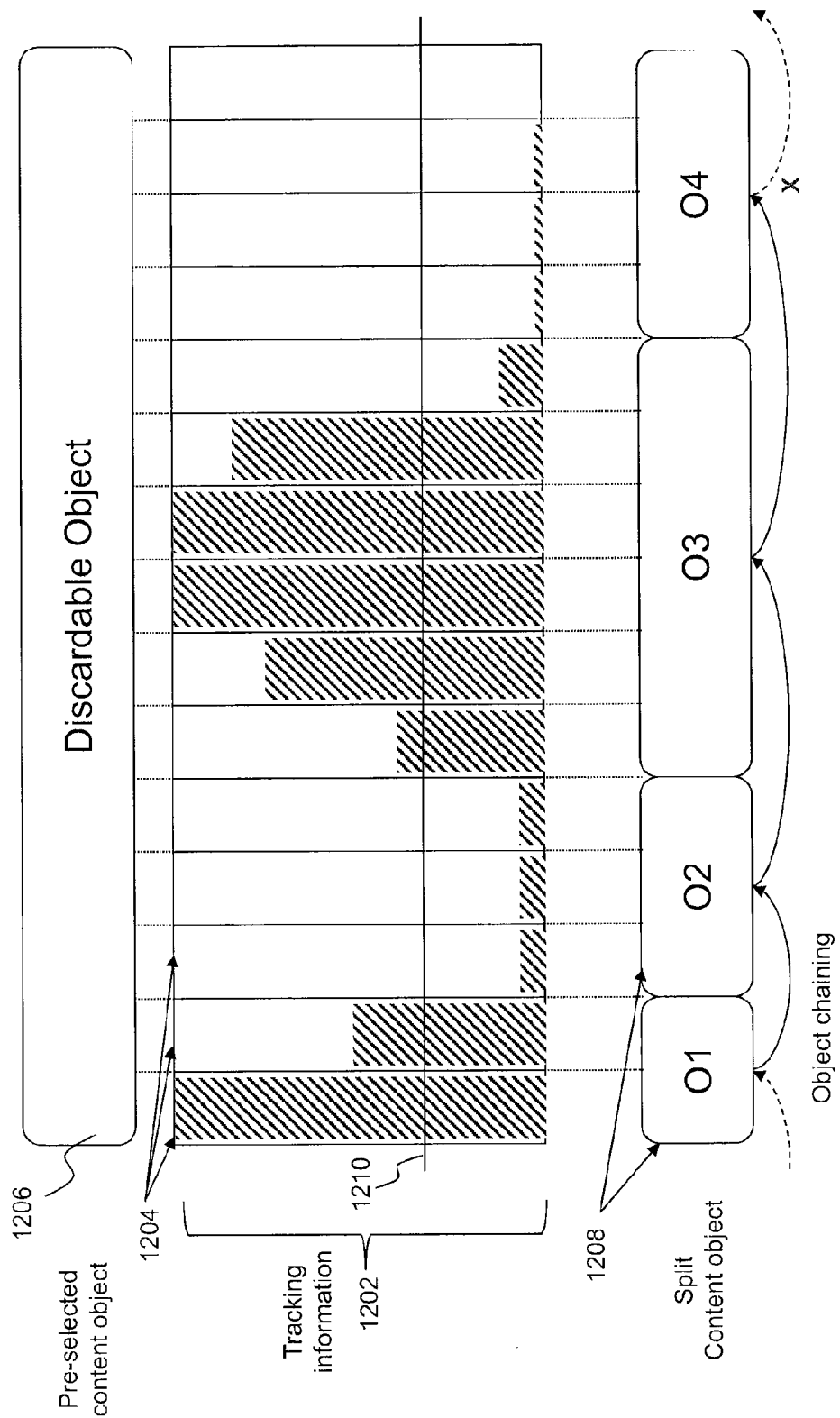
FIG. 12 illustrates an embodiment of splitting a discardable data object into additional discardable data objects.

FIG. 12 illustrates information 1202 tracked about storage elements 1204 within a discardable object 1206. This tracking information 1202 may be used to determine where to split the discardable object 1206. In this example, the storage allocator 204 splits the original discardable object 1206 in 4 smaller discardable objects (O1, O2, O3, O4) 1208 according to a computed split criteria 1210, such as a threshold number of accesses to storage elements 1204 within the discardable object 1206 based on the current tracking information 1200. The storage allocator 204 may keep track of object chaining information 2012 to record the order of the new discardable objects 1208 that have been created and the path or URI information associated with each. The discardable object (O4) split from the original discardable object 1202 with the least relevant information based on the tracking information 1200 could be discarded to free more space in the non-volatile memory 206 with very limited to no impact on the end user experience.

Discarding Strategy

As noted above, a purpose of creating discardable objects is to provide flexibility in generating free space on a storage device for new non-discardable or discardable content, while maintaining discardable content most relevant to a user on the storage device. Before a discardable object gets discarded, it is important to perform a selection to determine which discardable object(s) should be discarded. In one embodiment, the selection of discardable objects for deletion may be based first on dynamic information tracked for the objects and then according to each discard priority for the selected discardable object(s).

One or more of the following types of dynamic information may be considered when selecting eligible discardable objects to discard: Last time of access; number of accesses (e.g. plays): cumulative or within a past time window including a present time; and expiration status. Other dynamic information considered may be the space needed to store the data (e.g. could be better to impact a single content than many) and object size. The above examples of dynamic information are examples only and other types of dynamic information are contemplated.

Other information such as content type, overall size, may be considered for setting the priority as it is state rather than usage dependent. Yet priority could change also as some states could change as well. For example, a copy of the content could have been created, making the locally stored content (and its associated discardable objects) more discardable; or previously discardable content has been activated (purchased or authorized) making the associated discardable objects less discardable or non-discardable; and so on.

The selection of discardable objects to discard from the non-volatile memory by the storage allocator 204 is typically done using a range rather than a point selection, where point selection refers to performing a selection that returns at first a single result. For example, a selection that would always return the least accessed object or the oldest object. Although point selection of discardable objects by the storage allocator is contemplated in some embodiments using one or a combination of types of the discarding priority data, using a range selection process is contemplated in other embodiments. Range selection takes advantage of the discard priority to refine the selection, otherwise the most discardable object from the selection using all criteria is always discarded at first. For example, the selection of a range of candidate discardable objects for further consideration for discarding could be based on dynamic discarding priority data such as all objects whose last access is older than one month, instead of the object with the oldest access time. As another example, the storage allocator 204 may base the selection on the 20 least accessed objects rather than the least accessed.

The selection process may also combine multiple parameters, for example starting with expiration status, then last time of access, then number of accesses. When the selection returns no result, the range could be enlarged to potentially include more objects and point selection could be done at the end. Once the selection of candidates has been made, the discardable object(s) to discard may be selected according to the space needed and to the priority level. The discardable objects set with a more discardable priority are discarded as needed. When multiple objects eligible to be discarded have the same priority then the largest could be discarded first.

Figure 13:
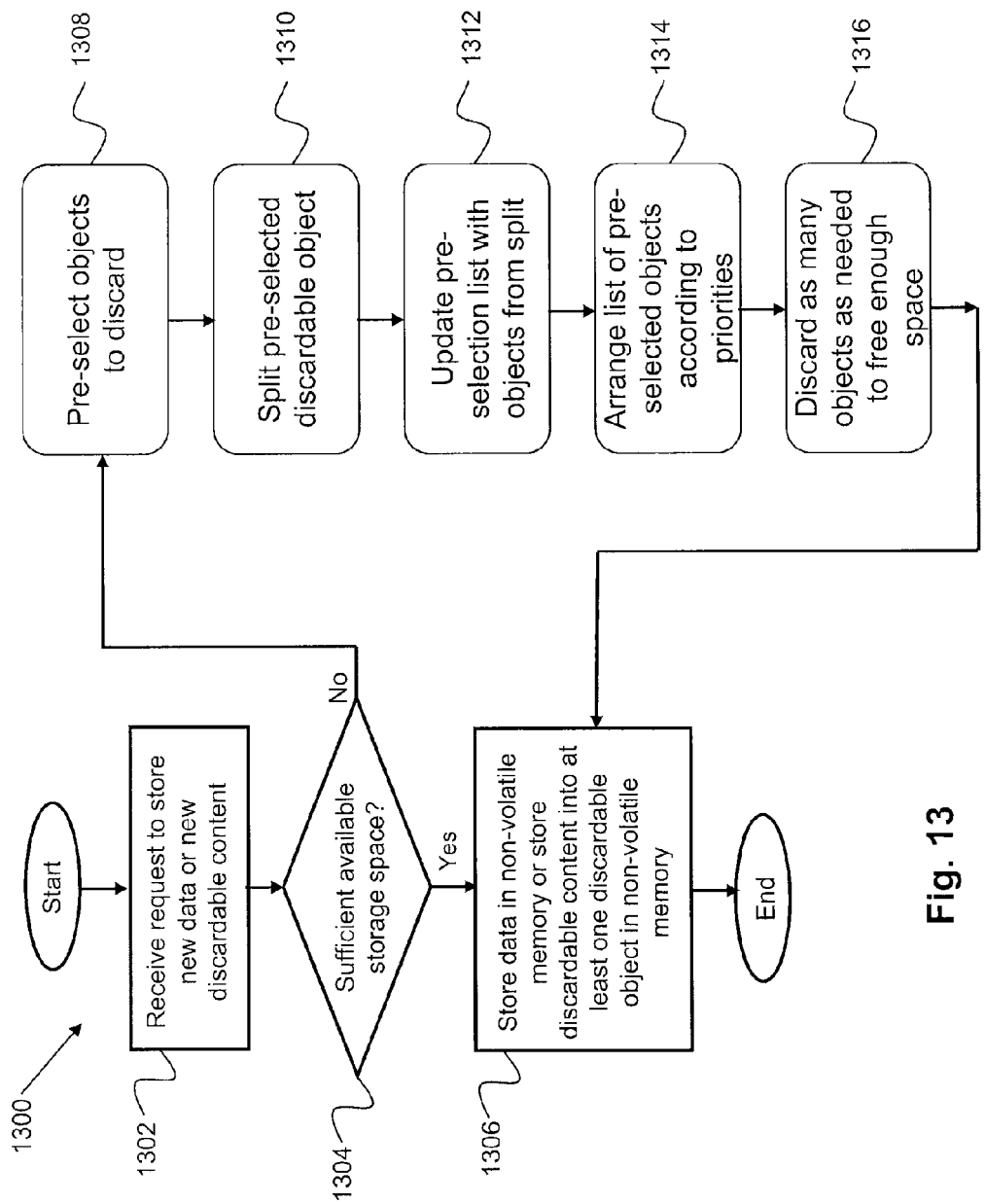
FIG. 13 is a flow diagram illustrating use of discarding priority data assigned to discardable data objects for discarding discardable data objects.

Some embodiments for selecting and discarding discardable objects may take advantage of the pre-selection of a range of discardable objects to split the largest discardable object in the selected range and then refine the selection based on the updated group of discardable objects, and deleting the least valuable discardable object first. FIG. 13 illustrates a process 1300 of discardable object selection and splitting for freeing space for new data. When a request to store new data (non-discardable) or discardable content is received (at 1302), the storage allocator determines whether there is a need for more storage space (at 1304) according to a predetermined threshold or to available space. If sufficient space is available, the new non-discardable data is written to the non-volatile memory 206, or if the request was for storing discardable content, the storage allocator 204 stores the discardable content into one or more discardable objects in the non-volatile memory as discussed previously.

If the storage allocator 204 determines that there is insufficient available space, the storage allocator begins a process of selecting discardable objects to discard from non-volatile memory 206 (at 1304). A determination by the storage allocator as to whether there is sufficient space available for a request to write data may be based on a fixed or variable threshold amount of free space that the storage device is required to maintain, or on other criteria. In the embodiment of FIG. 13, the storage allocator preselects discardable objects based on discarding priority data, or priorities determined from the discarding priority data, and information in the discarding priority database 220 to determine the most discardable group of discardable objects (at 1308). Then, the largest object in the pre-selected discardable objects may be split as discussed above (at 1310). If all pre-selected discardable objects are of same size, the splitting step may be skipped. Next, at 1312, the list of pre-selected discardable objects is updated to replace the split discardable object with the resulting smaller discardable objects. Each new discardable object is set with a discarding priority (or assigned discarding priority data) that could take in account the information used to split the object. The list of pre-selected discardable objects is rearranged according to discarding priorities including the priority of the new objects and one or more discardable objects from the list are discarded as needed (at 1314, 1316) to free up the necessary space. Finally, the new data could be stored or new discardable content stored into one or more discardable objects (at 1306).

Discard Triggers

The memory available for the storage of discardable objects is typically not unlimited and at some point adding new discardable objects may require discarding objects already stored in a manner such as discussed above in FIG. 13. The memory limitation could be physical (i.e. not enough storage available) or specified (i.e., accommodating the request reaches a threshold such as remaining storage for discardable objects, available storage for other data or total number of discardable objects). As such, when the space available for the discardable objects cannot accommodate a request to store discardable data because of the limit, one or more discardable objects need to be discarded. In that case, the underlying system managing the discardable objects would select an object or objects to discard and discard as many as needed. The storage allocator may then store the discardable data into one or more discardable objects along with other needed information such as object reference, position in a chain, and priority. In certain instances, there might be a situation where the received discardable data is more discardable than the selected objects and thus the storage allocator would discard the new discardable content instead of any of the selected objects so that no new content would be placed in discardable objects and no change would be made to existing discardable objects.

In some embodiments, the memory used to store the discardable objects could also be shared with data which is not for discard and, in that case, the size of the memory available for discardable objects is variable and could change over time. When data not for discard is removed (deleted), more space is potentially available for discardable objects. On the other hand, when more data not for discard is stored, less space is potentially available for discardable objects. Embodiments of this type ensure that the user is not penalized by the presence of discardable objects and that the user's storage space remains available for user-generated or other non-discardable content.

Discardable objects may also be discarded independently from the need for more storage space triggered by receipt of new non-discardable data or discardable content for storage the non-volatile memory. For example, when the content is taken down—for example when not authorized by the content owner—objects that store this data should be discarded right away. The underlying system typically includes an API to allow explicit discarding of one or more discardable objects in such situations. For example, a host application could receive information that a content piece has been taken down and would use such an API to explicitly discard the objects used to store such content.

Implementation of Handling Discardable Objects

Figure 14:
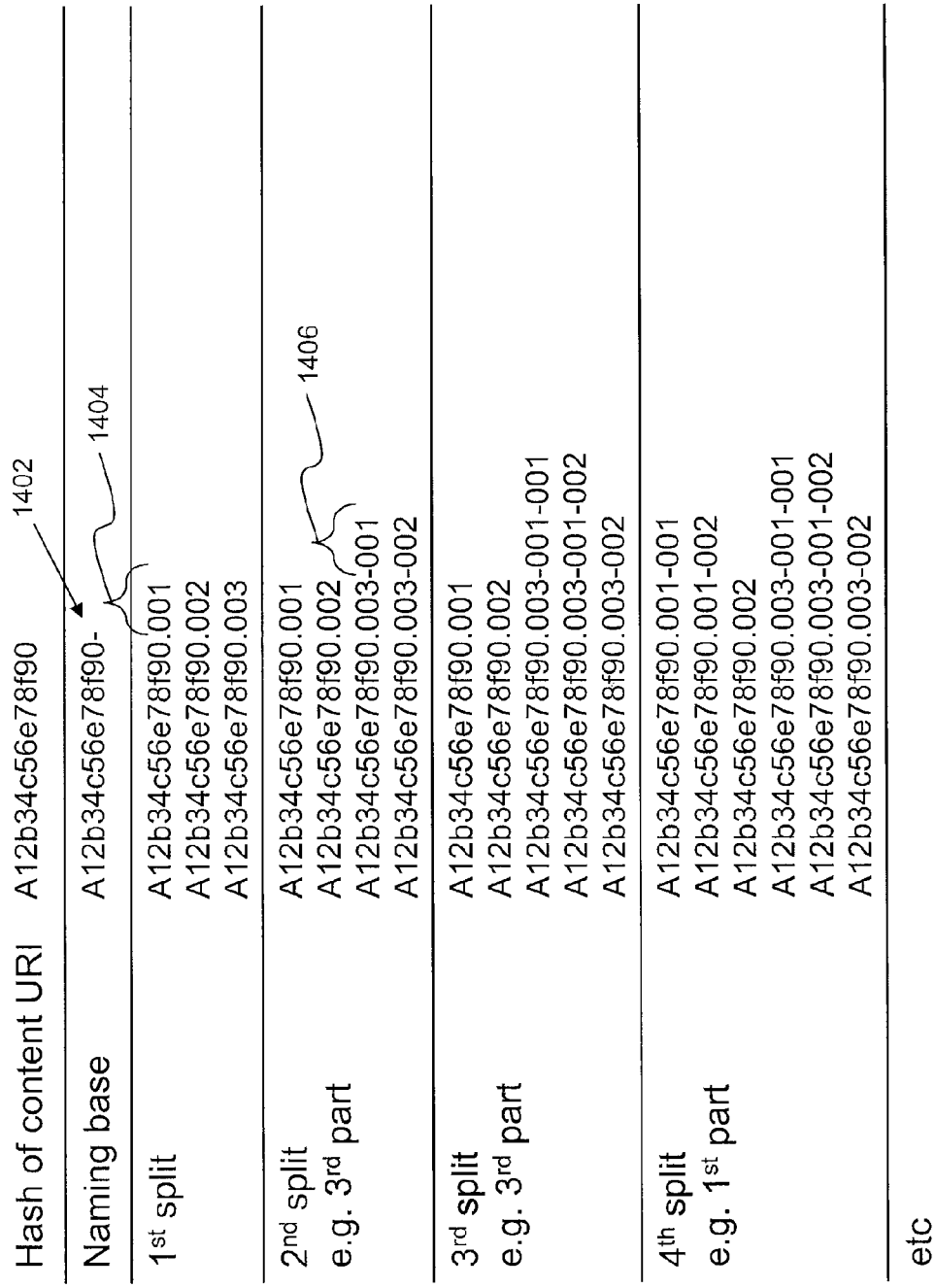
FIG. 14 is a flow diagram illustrating an alternate embodiment of the method of FIG. 13.

A host file system provides one way to manage discardable objects which could be stored as individual files and could be of various sizes (and could also support embodiments with objects of identical size). A discardable object in the form of a file could be created, split and deleted as needed thus providing support for various features of discardable objects discussed above. In one embodiment, a naming convention may be used to determine the chain of object. The naming may be accomplished in a similar way as done by applications such as ZIP applications, where compression could be a benefit but is not a requirement for discardable objects. A more sophisticated naming convention may be used to support splitting discardable objects. For example, the base name for a discardable object could be based on the hash of the URI of the content location. That base name could be appended with a number to define the chaining. Finally, splitting or re-splitting a discardable object could extend that naming with additional numbering. One example for naming discardable objects is provided in FIG. 14. In FIG. 14, the base name 1402 for a discardable object may be a hash of the URI of the source of the discardable object. When the discardable object is split into three smaller discardable objects, the resulting discardable objects may have an extension number 1404 (e.g. .001, .002 and .003) to the original name 1402. A further splitting of the already split discardable object may add a further extension 1406 to the name of the already split discardable object (here the .003 object was further split into .003-.001 and .003-.002). Subsequent splits may follow the same format as illustrated in FIG. 14. The naming approach discussed above, relating to using a hash of the URI of the discardable content, is not limited to use in the splitting of discardable objects and may be used generally to name discardable objects.

Implementation of Handling Priorities and Dynamic Information

Some implementations could use the file system to store the discarding priority data and take advantage of the file system for information such as age, last access and using the file extension to determine the file type.

Referring again to FIG. 6, an exemplary partial FAT32 table 600 is shown as a double-word ("DWORD") array, and the values are hexadecimal values. Reference numeral 602 designates the type of device holding FAT32 table 1500, where "F8" refers to a hard drive. FAT32 table 600 includes 23 clusters that are designated as cluster #1 (shown at 604), cluster #2 (shown at 606), . . . , and cluster #23 (shown at 608). A cluster in FAT32 table 600 may be the first cluster of a file, or it may point to the next linked cluster of the file, or it may be an End-of-File ("EOF") indication.

As shown in FIG. 6, first hypothetical file begins at cluster #2. The value of cluster #2 (i.e., the value "000 0003") points (shown at 610) at cluster #3, which is the next file's cluster.

Likewise, the value of cluster #3 (i.e., "0000 0004") points at cluster #4, which is the next file's cluster. Cluster #4 has the value "0FFF FFFF" ("F" is the hexadecimal digit that represents the decimal value "15"), where "FFF FFFF" (shown at 612) denotes the file's EOF indication, and the zero value (shown at 614) denotes discarding level 0. The hypothetical file, therefore, has associated with it three clusters (i.e., cluster #2, cluster #3, and cluster #4). In the example of FIG. 6 discarding level 0 may represent a non-discardable files and the most significant hexadecimal digit of each cluster of a particular file is set to the same discarding priority level. A discardable file that starts at cluster #5 and runs through cluster #12 may be assigned a discarding priority level other than 0, such "1". Therefore, the most significant hexadecimal digit of each of clusters #5 through 12, which pertain to that file, has the value "1" (for example as shown at 616). In this embodiment, the most significant hexadecimal digit or, equivalently, the four uppermost bits of the clusters associated with a particular discardable file are set to the same value corresponding to the discarding priority level assigned to the particular file. The number the uppermost bits used for indicating the discarding priority level may differ from four. The example of FIG. 6 is a simplified example of one of many options for tracking discarding priorities and information using a file system data structure. Although the ability of greater granularity in tracking discarding information using a separate discarding priority database 220 may be preferred in some embodiments, a file system data structure such as a FAT32 table 600 may store some or all of the discarding priority data in other embodiments.

In some embodiments, the discarding priority data could be stored as part of the file system as explained earlier. However, other implementations would favor storing the static and dynamic discarding priority data, along with any priority determined from the static and/or dynamic discarding priority data, in a file which, to facilitate the selection of objects to discard, could be formatted to hold information in a table or a database such as the discarding priority database 220. Using such an approach could provide more granularities in tracking the criteria used to determine the discarding priority. Such a file could also store extra information such as URI of remote content location and URI for all matching objects stored locally. Every time a file with discardable data is accessed, the information associated with the file gets updated. A file system typically operates in a manner where a cluster is the smallest amount of information that maybe addressed directly. Accordingly, in some embodiments, access tracking maybe done at cluster level rather than file level. This method would permit the splitting of a discardable object (that is larger than a cluster) into smaller objects as discussed above. The underlying system could monitor the cluster information and when a certain threshold is reached, split a file into smaller files according to the relevance of its clusters as discussed with respect to FIG. 12 above. Other implementations could combine approaches, for example of using a FAT for static discarding priority data and a database for dynamic discarding priority data.

Implementations of the Storage Allocator

The storage allocator could be implemented in different ways. One approach is to implement the storage allocator as part of the file system API for example as illustrated in FIG. 1C. As such, the storage allocator can transparently handle both the normal file as well as the files by the discardable objects. Such an implementation provides the best approach because it ensures that both types of content (non-discardable and discardable) can share the non-volatile memory without overlapping each other. Other implementations could be considered as well.

In some embodiments the storage allocator is an implementation of a file system that comes with extra features that permit it to handle discardable files and that takes care of selecting and discarding files when needed. In other embodiments, the storage allocator may be implemented on a host device using an API provided for a file system filter. As such, the storage allocator does not have to manage the file system but could intercept calls to a file system API and pass those intercepted calls to a file system filter when needed. Having the storage allocator as part of the file system's APIs could permit the storage allocator to hide a discardable object file from normal file operation, for example by having a file system filter in the file system API prevent the listing of discardable objects when a listing of data on the storage device is requested. In contrast, it could also permit the file system to expose content in response to a file system directory command which may be present only in part or no longer present on the storage device. Alternatively, the storage allocator could present a list of all the content that has ever been on the storage device, either in part or in full, even when all discardable objects related to such content have been discarded. In this latter implementation, the list would be associated with URI or other tracking information, maintained in the discarding priority database or other location in the storage device, can provide a link to the source of the information for later fetching. By extension, content that has never been on the storage device could also be listed. One way of marking a file as discardable may be to add a name extension to a file name that would be interpreted by the file system filter as requiring that information to be stored as discardable. Thus, the file system filter could be implemented as a part of the storage allocator (providing a portion of the functionality of the storage allocator as described herein).

Implementation of Split Storage Allocator

As explained earlier, in some embodiments the storage allocator is located in part or in whole in the storage device. In these embodiments, the file system API is typically managed on the host but the storage allocator handled by the storage device (e.g. the controller) can still manage the files or other type of discardable content adequately to enable discardable files by monitoring all incoming requests. Furthermore, a specific API maybe provided by the storage device for the host to use in order to create, access, delete and update discardable files.

Because the host has its own image of the file system, the storage allocator would have to operate underneath the host file system and be careful not to impact it. Flash storage devices typically use LBA (logical block addressing) to separate from actual PBA (physical block addressing). These devices typically use LBA to PBA conversion in order to reach the actual data. A similar approach could be used to ensure that normal files (non-discardable content) could share the storage space with discardable files (content).

Figure 15:
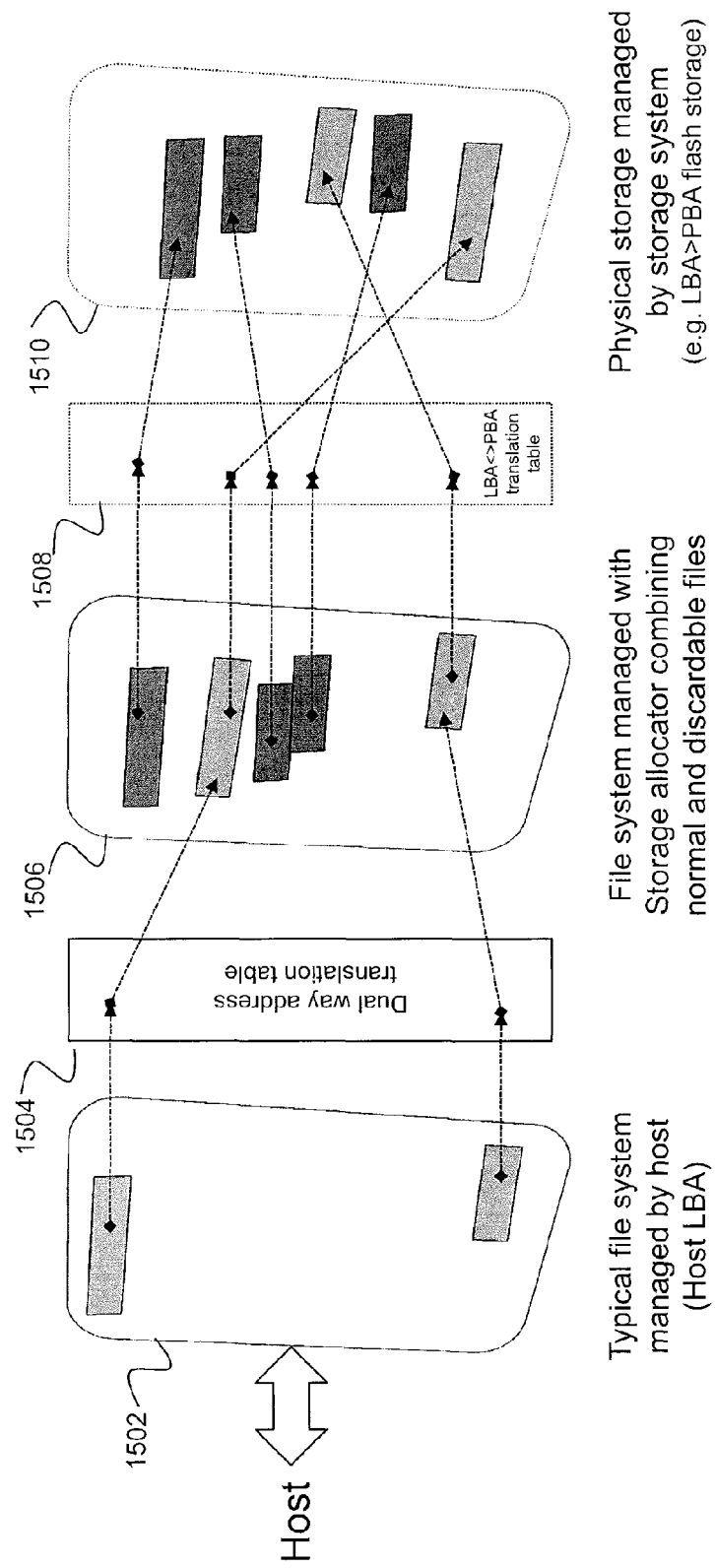
FIG. 15 is a flow diagram of a method of selecting and further splitting discardable data objects.

FIG. 15 illustrates an exemplary process where the host-managed file system 1502 is based on logical block addresses (LBAs). The use of LBAs ensures that addresses used by non-discardable data may be translated in a dual-way translation table 1504 in a manner that does not conflict with addresses used by the storage allocated for discardable objects. The storage allocator can then manage its file system 1506 combining host files and discardable objects which could also sit on top of an LBA to PBA translation table 1508 to make sure non-discardable (normal) data and discardable objects are properly stored in the non-volatile memory 1510 of the storage device.

As the storage allocator is closely involved in managing the location of the discardable objects, such object files could be created preferably in areas where the memory would support a larger number of read/write cycles. This could be important for non-volatile memory such as NAND flash where the physical limit of read/write cycles could be reached in a limited amount of time with transient content.

In certain implementations, such as shown in FIG. 11, the storage allocator could be network ready and be capable of fetching missing data when needed. This capability opens the door for additional integration where the storage allocator could be integrated with the network stack in addition to the file system in order to provide some local proxy functions. Such integration could be done in the network stack or with a proxy locally installed on the storage device.

Systems and methods have been described for freeing space in a storage device by automatically deleting certain types of data referred to herein as discardable content. The discardable content may be partial or complete files, streamed data or other types of data that was unsolicited by a user or application, or that was generated or requested by a user but has become discardable because of subsequent activity such as the creation of a back-up copy that is readily accessible. The space used for discardable files may be released automatically on user need and based on user interest, which is different than setting aside some reserved storage which is a technique used in some applications such as Internet Explorer. Through the use of discarding priority, taking into account parameters that may be static and relating to whole content or content pieces, or dynamic and relating to access activity for discardable objects for content, or data elements within the discardable objects) or both, allows the discardable objects to be ranked. The most relevant of the discardable content may then be retained by deleting less relevant discardable data. The capability of retaining only the most relevant discardable data is further improved by breaking down discardable content into multiple discardable objects, and then further subdividing those discardable data objects when appropriate to allow a finer granularity of maintain only the most relevant portions of discardable content. Discardable objects for different content may be given preference to maximize the number of different content represented in the discardable objects that are retained in non-volatile memory. The systems and methods disclosed herein may also assist in providing copy protection for locally stored content through automated takedown procedures that may be initiated separate from receiving a request to store new data that triggers deletion of appropriate discardable content to free up space. Accordingly, a system and method for managing use of a non-volatile storage device as transient storage where data could be discarded to release space to store more relevant content to the user has been described.

What is claimed is:

1. A method for host management of a non-volatile memory, the method comprising:
    in a host to which a non-volatile memory is operatively coupled:
        in response to a request to store at least a portion of content in the non-volatile memory, dividing the at least a portion of the content into a plurality of discardable data objects and associating each discardable data object with discarding priority data; and
        in response to a request to store new data or new discardable content when the non-volatile memory has less than a predetermined amount of free space to accommodate the new data or new discardable content:
            subdividing at least one of the plurality of discardable data objects into new discardable data objects;
            arranging a list of the discardable data objects and new discardable data objects for automatic deletion, the arranged list having an order based on respective discarding priority data; and
            identifying for deletion discardable data objects or new discardable data objects in the arranged list sufficient to achieve the predetermined amount of free space.

2. The method of claim 1, wherein associating each discardable data object with discarding priority data comprises associating at least one discardable data object of the content with different discarding priority data than discarding priority data of a discardable data object of different content.

3. The method of claim 1, further comprising updating an existing discarding priority data of at least one discardable data object.

4. The method of claim 3, wherein associating each discardable data object with a discarding priority data comprises assigning a first of a sequence of discardable data objects of the discardable content discarding priority data such that the first of the sequence has a lower likelihood of deletion than any remaining discardable data objects of the content.

5. The method of claim 3, where updating the existing discarding priority data comprises updating the existing discarding priority data with different discarding priority data than that of another discardable data object of the content.

6. The method of claim 5, wherein updating the existing discarding priority data of at least one discardable data object comprises changing the existing discarding priority data based on at least one dynamic priority criteria determined when the at least one discardable data object is accessed.

7. The method of claim 6, wherein the at least one dynamic priority criteria comprises a time of last access of the discardable data object.

8. The method of claim 1, wherein identifying for deletion comprises selectively identifying for deletion, based on respective discarding priority data for the discardable data objects, one or more discardable data objects without identifying all discardable data objects for the content in order to free space in the non-volatile memory.

9. The method of claim 1, wherein identifying for deletion comprises selectively identifying for deletion one or more discardable data objects of a first content, without identifying all discardable data objects for the first content, in response to receipt of another content wherein a number of discardable data objects of different content is maximized.

10. A host system for managing a non-volatile memory, the host system comprising:
    a host processor and a non-volatile memory interface configured for communication with the non-volatile memory;
    wherein the host processor is configured to:
        in response to a request to store at least a portion of content in the non-volatile memory, divide the at least a portion of the content into a plurality of discardable data objects and associate each discardable data object with discarding priority data; and
        in response to a request to store new data or new discardable content when in the non-volatile memory has less than a predetermined amount of free space to accommodate the new data or new discardable content:
  subdivide at least one of the plurality of discardable data objects into new discardable data objects;
  arrange a list of the discardable data objects and new discardable data objects for automatic deletion, the arranged list having an order based on respective discarding priority data; and
  identify for deletion discardable data objects or new discardable data objects in the arranged list sufficient to achieve the predetermined amount of free space.

11. The host system of claim 10, wherein the host processor is configured to associate at least one discardable data object of the content with different discarding priority data than the discarding priority data of another discardable data object of the content.

12. The host system of claim 11, wherein the host processor is configured to associate a first of a sequence of discardable data objects of the content with discarding priority data such that the first of the sequence has a lower likelihood of deletion than any remaining discardable data objects of the content.

13. The host system of claim 10, wherein the host processor is configured to update existing discarding priority data of at least one discardable data object.

14. The host system of claim 13, wherein the host processor is configured to update existing discarding priority data based on at least one dynamic priority criteria determined when the at least one discardable data object is accessed.

15. The host system of claim 14, wherein the at least one dynamic priority criteria comprises an age of the discardable data object.

16. The host system of claim 10, wherein the host processor is configured to maximize a number of discardable data objects of different contents.

17. A method for managing a non-volatile memory of a memory system operatively coupled with a host, the method comprising:
  in a processor of the memory system, where the processor is in communication with non-volatile memory, the processor:
    in response to a request to store at least a portion of content in the non-volatile memory, dividing the at least a portion of the content into a plurality of discardable data objects and associating each discardable data object with discarding priority data; and
    in response to a request to store new data or new discardable content when a predetermined amount of free space is unavailable in the non-volatile memory to accommodate the new data or new discardable content:
      subdividing at least one of the plurality of discardable data objects into new discardable data objects;
      arranging a list of the discardable data objects and new discardable data objects for automatic deletion, the arranged list having an order based on respective discarding priority data; and
      deleting discardable data objects or new discardable data objects in the arranged list sufficient to achieve the predetermined amount of free space.

18. The method of claim 17, wherein associating each discardable data object with discarding priority data comprises associating at least one discardable data object of the content with different discarding priority data than discarding priority data of a discardable data object of different content.

19. The method of claim 17, further comprising updating an existing discarding priority data of at least one discardable data object.

20. The method of claim 19, wherein associating each discardable data object with a discarding priority data comprises assigning a first of a sequence of discardable data objects of the discardable content discarding priority data such that the first of the sequence has a lower likelihood of deletion than any remaining discardable data objects of the content.

21. The method of claim 19, where updating the existing discarding priority data comprises updating the existing discarding priority data with different discarding priority data than that of another discardable data object of the content.

22. The method of claim 21, wherein updating the existing discarding priority data of at least one discardable data object comprises changing the existing discarding priority data based on at least one dynamic priority criteria determined when the at least one discardable data object is accessed.

23. The method of claim 22, wherein the at least one dynamic priority criteria comprises a time of last access of the discardable data object.

24. The method of claim 17, wherein deleting the amount of discardable data objects comprises selectively deleting, based on respective discarding priority data for the discardable data objects, one or more discardable data objects without deleting all discardable data objects for the content in order to free space in the non-volatile memory.

25. The method of claim 17, wherein deleting the amount of discardable data objects comprises selectively deleting one or more discardable data objects of a first content, without deleting all discardable data objects for the first content, in response to receipt of another content wherein a number of discardable data objects of different content is maximized.

26. A memory system for managing data received from a host, the memory system comprising:
  a non-volatile memory; and
  a processor operatively coupled to the non-volatile memory, wherein the processor is configured to:
    receive a request to store at least a portion of content in the non-volatile memory;
    divide the at least a portion of the content into a plurality of discardable data objects;
    associate each discardable data object with discarding priority data; and
    receive a request to store new data or new discardable content and, when a predetermined amount of free space is unavailable in the non-volatile memory to accommodate the new data or new discardable content:
      subdivide at least one discardable data object into new discardable data objects;
      arrange a list of the discardable data objects and new discardable data objects for automatic deletion having an order based on respective discarding priority data; and
      delete discardable data objects or new discardable data objects in the arranged list sufficient to achieve the predetermined amount of free space.

27. The memory system of claim 26, wherein the processor is configured to associate at least one discardable data object of the content with different discarding priority data than the discarding priority data of another discardable data object of the content.

28. The memory system of claim 27, wherein the processor is configured to associate a first of a sequence of discardable data objects of the content with discarding priority data such that the first of the sequence has a lower likelihood of deletion than any remaining discardable data objects of the content.

29. The memory system of claim 26, wherein the processor is configured to update existing discarding priority data of at least one discardable data object.

30. The memory system of claim 29, wherein the processor is configured to update existing discarding priority data based on at least one dynamic priority criteria determined when the at least one discardable data object is accessed.

31. The memory system of claim 30, wherein the at least one dynamic priority criteria comprises an age of the discardable data object.

32. The memory system of claim 26, wherein the processor is configured to maximize a number of discardable data objects of different contents.

* * * * *